(12) United States Patent
Higo et al.

(10) Patent No.: US 10,951,931 B2
(45) Date of Patent: Mar. 16, 2021

(54) DATA DISTRIBUTION SYSTEM, DATA DISTRIBUTION METHOD, MARKER, FILTER AND PROGRAM

(71) Applicant: NIPPON TELEGRAPH AND TELEPHONE CORPORATION, Chiyoda-ku (JP)

(72) Inventors: Naoki Higo, Musashino (JP); Ryota Ishibashi, Musashino (JP); Toshimitsu Tsubaki, Yokohama (JP); Yoshiko Sueda, Musashino (JP); Masao Aihara, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 0 days.

(21) Appl. No.: 16/482,996

(22) PCT Filed: Jan. 12, 2018

(86) PCT No.: PCT/JP2018/000573
§ 371 (c)(1),
(2) Date: Aug. 1, 2019

(87) PCT Pub. No.: WO2018/142874
PCT Pub. Date: Aug. 9, 2018

(65) Prior Publication Data
US 2019/0349610 A1    Nov. 14, 2019

(30) Foreign Application Priority Data

Feb. 6, 2017   (JP) .............................. JP2017-019891

(51) Int. Cl.
*H04N 21/235*    (2011.01)
*H04L 29/08*    (2006.01)
(Continued)

(52) U.S. Cl.
CPC ..... *H04N 21/2358* (2013.01); *H04L 67/2823* (2013.01); *H04N 21/23605* (2013.01); *H04N 21/4355* (2013.01)

(58) Field of Classification Search
CPC ......... H04N 21/2358; H04N 21/23605; H04N 21/4355; H04N 21/234327;
(Continued)

(56) References Cited

U.S. PATENT DOCUMENTS 6,570,851 B1   5/2003   Koskelainen et al.
6,590,902 B1   7/2003   Suzuki et al.
(Continued)

FOREIGN PATENT DOCUMENTS

JP    2000-78573 A    3/2000
JP    2001-345847 A   12/2001
(Continued)

OTHER PUBLICATIONS

International Search Report dated Apr. 3, 2018 in PCT/JP2018/000573 filed Jan. 12, 2018.
(Continued)

*Primary Examiner* — Dady Chery
(74) *Attorney, Agent, or Firm* — Oblon, McClelland, Maier & Neustadt, L.L.P.

(57) ABSTRACT

A data distribution system including a source configured to distribute data and a sink configured to process the distributed data includes a marker configured to receive a packet distributed by the source, add supplementary information to the received packet based on information obtained from a header of the packet, and transfer the packet; and a filter configured to receive the packet transferred by the marker, determine whether the received packet can be transferred to
(Continued)

the sink based on the supplementary information added to the packet, transfer the packet to the sink if the packet can be transferred to the sink.

14 Claims, 28 Drawing Sheets

(51) Int. Cl.
*H04N 21/236* (2011.01)
*H04N 21/435* (2011.01)

(58) Field of Classification Search
CPC ........... H04N 21/6405; H04N 21/6338; H04N 21/2381; H04N 21/23439; H04N 21/631; H04L 67/2823; H04L 69/22; H04L 12/185
See application file for complete search history.

(56) References Cited

U.S. PATENT DOCUMENTS

| | | | |
|---|---|---|---|
| 6,975,645 B1 | 12/2005 | Suzuki et al. | |
| 2001/0048662 A1 | 12/2001 | Suzuki et al. | |
| 2003/0118107 A1 | 6/2003 | Itakura et al. | |
| 2015/0289159 A1* | 10/2015 | Jeong | H04W 72/1247 370/236 |

FOREIGN PATENT DOCUMENTS

| | | |
|---|---|---|
| JP | 2003-152544 A | 5/2003 |
| JP | 2011-142441 A | 7/2011 |

OTHER PUBLICATIONS

Keller, R. et al., "An Active Router Architecture for Multicast Video Distribution," In INFOCOM, 2000, Nineteenth Annual Joint Conference of the IEEE Computer and Communications Societies, Proceedings, 2000, vol. 3, pp. 1137-1146.

Black, D. et al., "Differentiated Services (Diffserv) and Real-Time Communication," RFC7657, IETF, Nov. 2015, pp. 1-26.

ISO/IEC 23009-1, "Dynamic adaptive streaming over HTTP (DASH)," May 15, 2014, 152 pages.

Fenner, B. et al., "Protocol Independent Multicast—Sparse Mode (PIM-SM) : Protocol Specification (Revised)," Internet Engineering Task Force (IETF), Request for Comments: 7761, Mar. 2016, pp. 1-137.

Japanese Office Action dated Apr. 28, 2020 in Japanese Patent Application No. 2018-566015 (submitting English translation only), 4 pages.

* cited by examiner

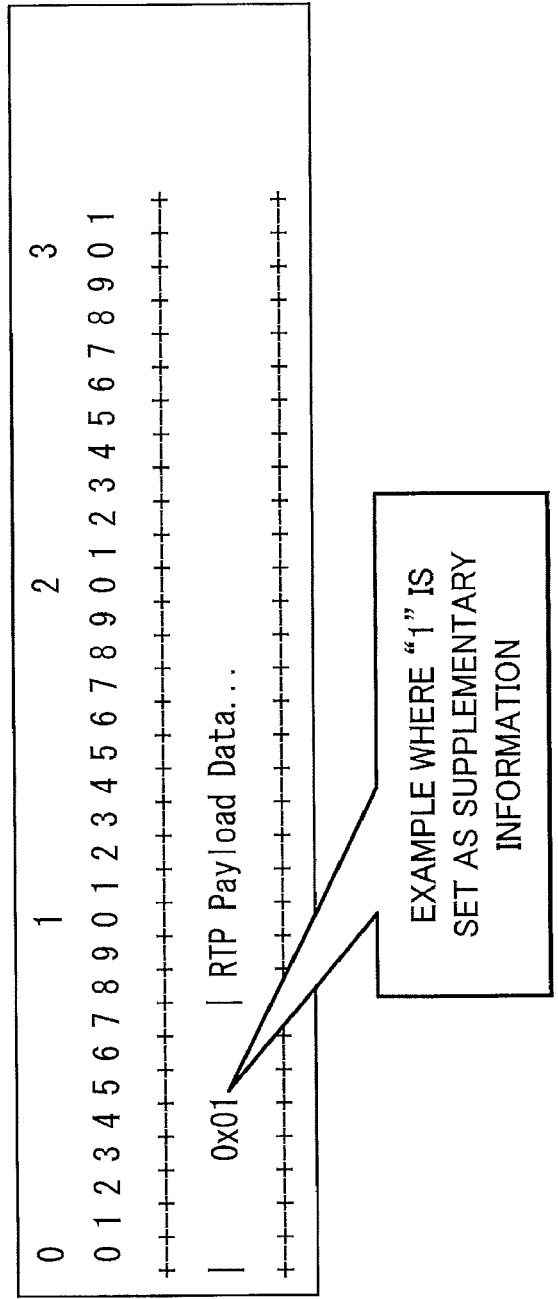

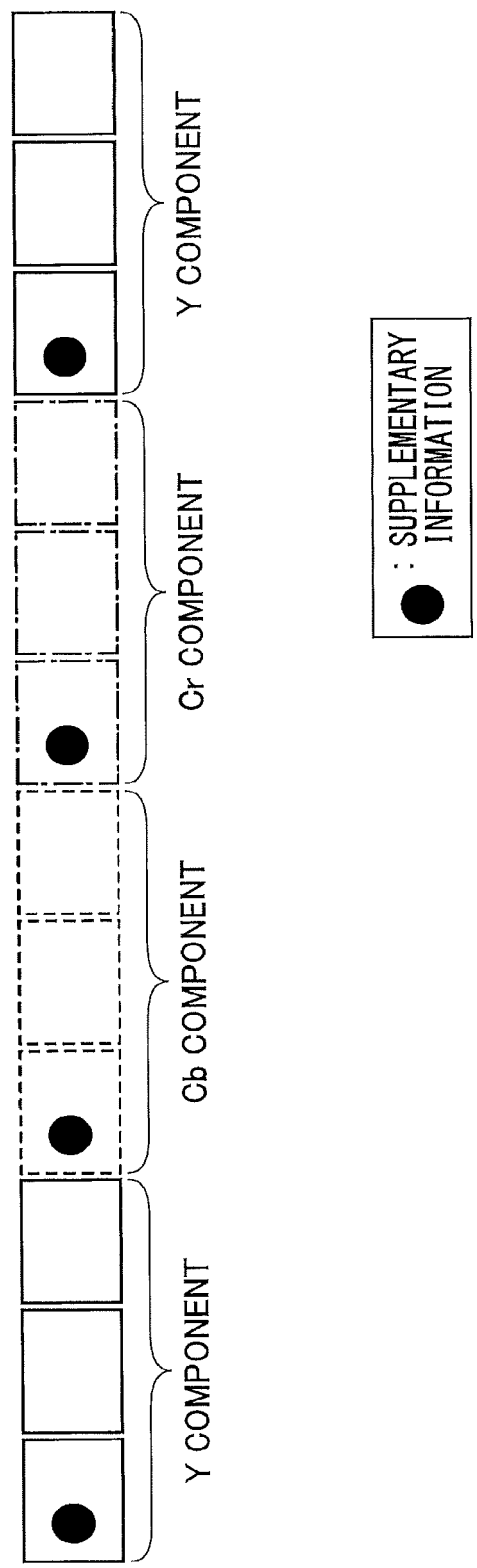

DATA DISTRIBUTION SYSTEM, DATA DISTRIBUTION METHOD, MARKER, FILTER AND PROGRAM

TECHNICAL FIELD

The present invention relates to a data distribution system, a data distribution method, a marker, a filter, and a program.

BACKGROUND ART

In order to distribute data streams such as video to a plurality of users, MPEG-DASH (Moving Picture Experts Group-Dynamic Adaptive Streaming over HTTP) has been proposed to distribute streams that are suitable for users with different requirements for a resolution, a frame rate, an area coordinate, and/or the like (see Non-Patent Document 1).

In the MPEG-DASH, a source node of a stream prepares various types of to-be-distributed data by processing (for example, encoding) data according to a combination of a resolution, a frame rate, a coordinate area, and/or the like which may be required by destination nodes, and distributes most suitable data among the prepared to-be-distributed data according to a request from a destination node which connects to the source node or a request modified during communication, such that the source node can simultaneously respond to different requests from destination nodes.

In order to simultaneously distribute the same data to a plurality of destination nodes with the same requirements, a multicast technique is used (see Non-Patent Document 2). In the multicast technique, an intermediate node (for example, a router) responsible for data transfer over a network receives data from an upstream node, copies the data, and distributes the data to downstream nodes.

Prior-Art Documents

Non-Patent Documents

[Non-Patent Document 1] ISO/TEC 23009-1, "Dynamic adaptive streaming over HTTP (DASH)," 2014 May 15
[Non-Patent Document 2] IETF RFC7761, "Protocol Independent Multicast-Sparse Mode (PIM-SM)," March 2016

DISCLOSURE OF INVENTION

Problem(s) to be Solved by the Invention

In the MPEG-DASH, a source node can respond to different requests from destination nodes. However, the source node needs to separately distribute data to each destination node with a different requirement, which faces a problem of consuming a communication bandwidth and a capacity of the source node accordingly.

In the multicast technique, when a plurality of destination nodes have the same purpose (for example, a purpose of viewing a broadcast), a source node can simultaneously distribute data by efficiently using a communication bandwidth and a capacity of the source node. However, when destination nodes have different purposes (for example, purposes of viewing, auto-analysis, and storage), different schemes of data reception and different types of data content are needed for the destination nodes (for example, some destination nodes place emphasis on real-time performance and some destination nodes place emphasis on reliability, and/or some destination nodes place emphasis on resolution or some destination nodes place emphasis on luminance).

Since data are copied and then distributed according to the multicast technique, a distribution scheme or data content cannot be modified according to a purpose of a destination node. Thus, the destination node needs to interpret or convert data according to the purposes, which faces a problem of increasing a workload of the source node.

It is an object of the present invention to reduce workloads of a source node and a plurality of destination nodes when the source node distributes data to the destination nodes with different requirements, and to decrease communication traffic.

Means for Solving the Problem(s)

In one aspect of the present invention, there is provision for a data distribution system including a source configured to distribute data and a sink configured to process the distributed data, including:
a marker configured to receive a packet distributed by the source, add supplementary information to the received packet based on information obtained from a header of the packet, and transfer the packet; and
a filter configured to receive the packet transferred by the marker, determine whether the received packet can be transferred to the sink based on the supplementary information added to the packet, and transfer the packet to the sink if the packet can be transferred to the sink.

In another aspect of the present invention, there is provision for a data distribution method in a data distribution system including a source configured to distribute data and a sink configured to process the distributed data, the data distribution system further including a marker and a filter which are located between the source and the sink, including steps of:
receiving, by the marker, a packet distributed by the source, adding supplementary information to the received packet based on information obtained from a header of the packet, and transferring the packet; and
receiving, by the filter, the packet transferred by the marker, determining whether the received packet can be transferred to the sink based on the supplementary information added to the packet, and transferring the packet to the sink if the packet can be transferred to the sink.

In another aspect of the present invention, there is provision for a marker located between a source configured to distribute data and a sink configured to process the distributed data, including:
a reception unit configured to receive a packet distributed by the source;
a supplementary information addition unit configured to add supplementary information to the received packet based on information obtained from a header of the packet; and
a transfer unit configured to transfer the packet to which the supplementary information is added to a filter configured to determine whether the packet can be transferred to the sink.

In another aspect of the present invention, there is provision for a filter located between a source configured to distribute data and a sink configured to process the distributed data, including:
a reception unit configured to receive a packet to which supplementary information is added, the packet being transferred by a marker configured to add the supplementary information to the packet distributed by the source;

a transfer determination unit configured to determine whether the packet can be transferred to the sink based on the supplementary information added to the received packet; and a transfer unit configured to transfer the packet to the sink if the packet can be transferred to the sink.

In another aspect of the present invention, there is provision for a program for causing a computer to function as each unit of the foregoing marker.

In another aspect of the present invention, there is provision for a program for causing a computer to function as each unit of the foregoing filter.

Advantageous Effect of the Invention

According to the present invention, it is possible to reduce workloads of a source node and a plurality of destination nodes when the source node distributes data to the destination nodes with different requirements, and to decrease communication traffic.

BRIEF DESCRIPTION OF THE DRAWINGS

FIG. 20B is a first example of a marking scheme in a marker (in the case where an RTP payload is used).

FIG. 21B is a second example of a marking scheme (block-level marking scheme) in a marker.

DETAILED DESCRIPTION OF THE PREFERRED EMBODIMENTS

Embodiments of the present invention are described below with reference to the drawings.

<Overall Configuration of Data Distribution System>

Figure 1:
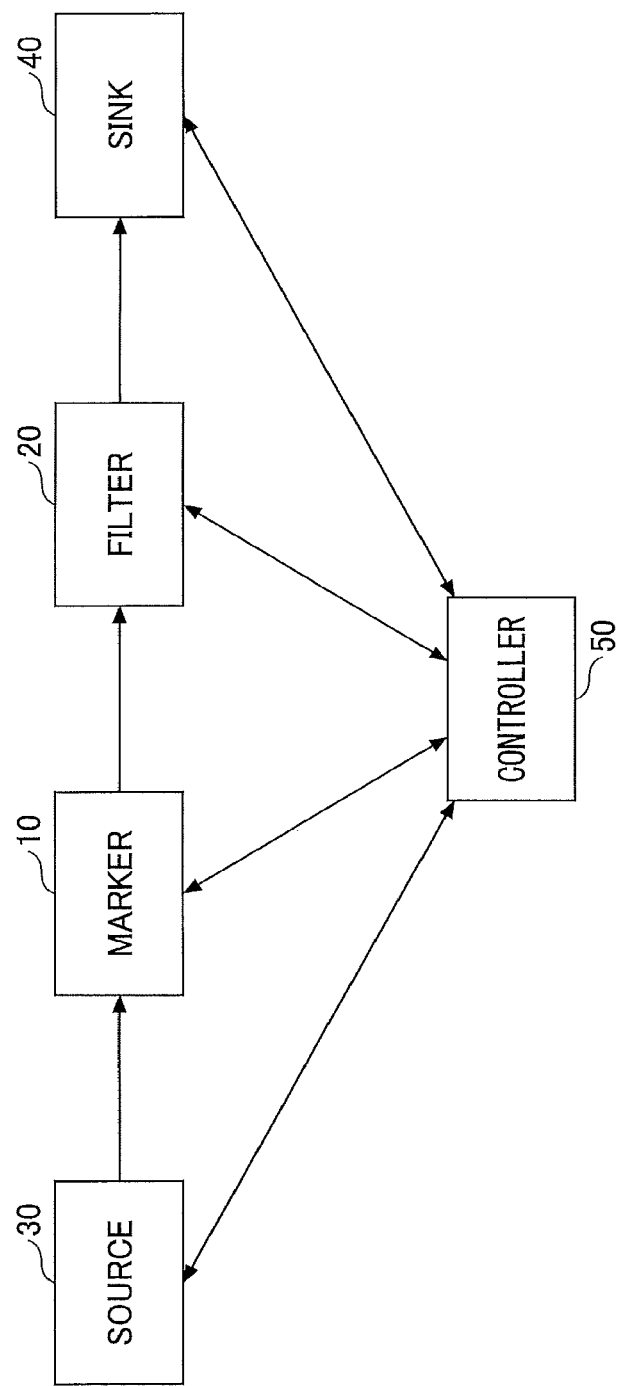
FIG. 1 is a diagram illustrating an overall configuration of a data distribution system according to an embodiment of the present invention.

FIG. 1 is a diagram illustrating an overall configuration of a data distribution system according to an embodiment of the present invention. In the data distribution system, a marker 10 and a filter 20 are located between a source 30 and a sink 40. The data distribution system enables the marker 10 and the filter 20 to extract specific information from data such as images distributed by the source 30 and to transfer the specific information to the sink 40, in a process of encoding, transferring, and decoding the data. Thus, in the process of transferring data, the data distribution system can convert the data into a gray-scale image, a low-resolution image, a partial image, or the like without decoding the data and can contribute to reduction of workloads of the source 30 and the sink 40 and decrease of communication traffic.

As illustrated in FIG. 1, the data distribution system includes the marker 10, the filter 20, the source 30, and the sink 40. The data distribution system may further include a controller 50.

The source 30 is an apparatus (source node) that distributes data such as video. For example, the source 30 may be a camera, a video distribution sever, or the like. The source 30 may be formed by a plurality of apparatuses such as a combination of a camera and a video distribution server.

The sink 40 is an apparatus (destination node) that requests data distribution from the source 30 and processes (for example, displays, analyzes, or stores) the received data. For example, the sink 40 may be a viewer or the like. The sink 40 may be formed by a plurality of apparatuses such as a combination of a viewer and a video reproduction server.

The marker 10 is an apparatus (node) that adds supplementary information indicating a data boundary, semantics information, or the like to a packet distributed by the source 30 and transfers the packet. Hereinafter, an operation by the marker 10 of adding supplementary information is referred to as a marking scheme.

The filter 20 is an apparatus (node) that receives the packet transferred by the marker 10 and determines whether the packet can be transferred to the sink 40 based on the supplementary information added by the marker 10. The filter 20 can extract data content suitable for the sink 40 from the received packet and transfer the data content to the sink 40. Hereinafter, an operation by the filter 20 of determining whether the packet can be transferred is referred to as a filtering scheme.

The controller 50 is an apparatus (node) that receives a sink request notification indicating data content requested by the sink 40 and, based on the sink request notification, configures the marking scheme in the marker 10 and the filtering scheme in the filter 20. The controller 50 obtains the sink request notification from the sink 40 and configures operations of the respective nodes, such that a type and a distribution scheme in data distributed by the source 30, the marking scheme in the marker 10, and the filtering scheme in the filter 20 are harmonized.

Figure 2:
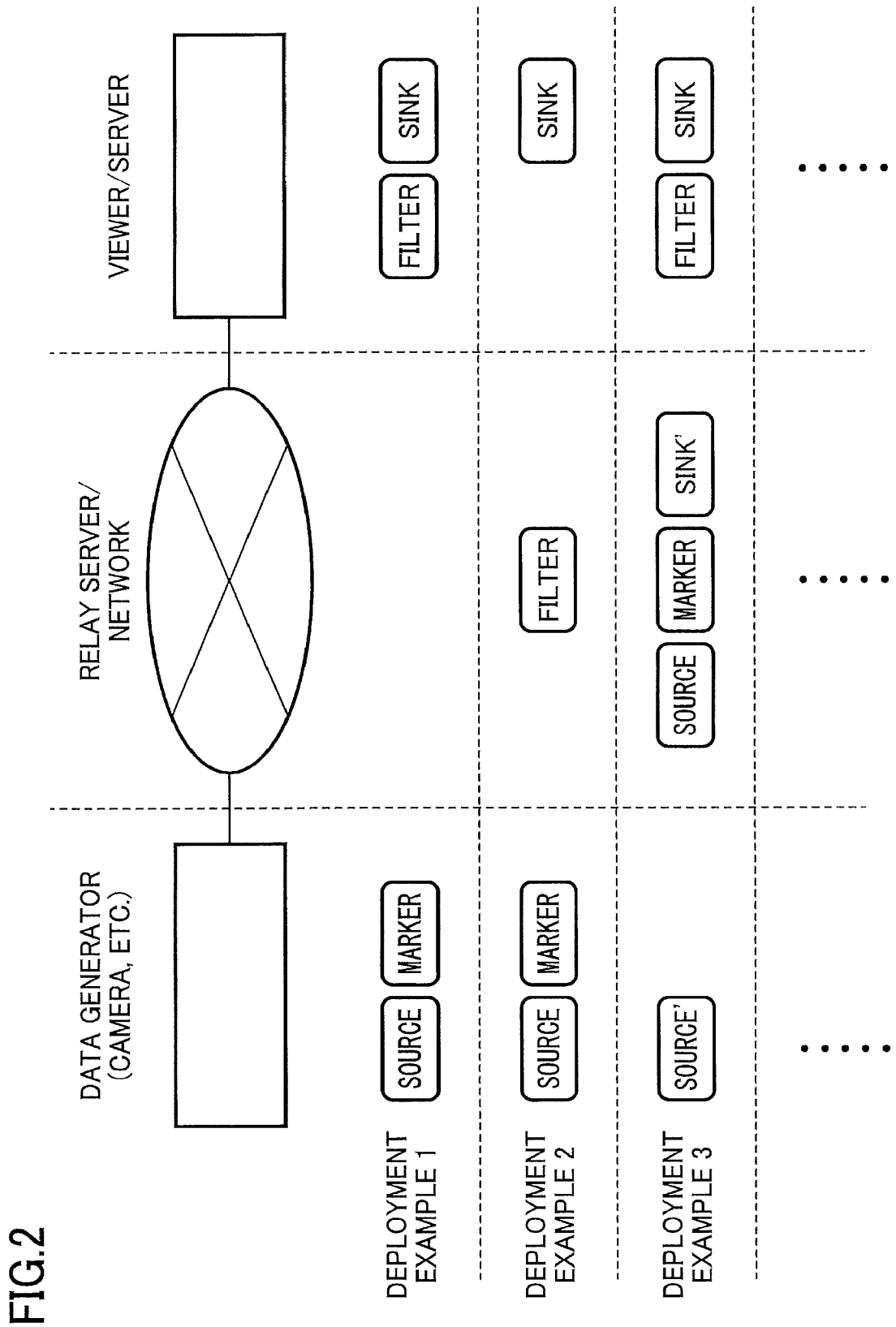
FIG. 2 is a diagram illustrating examples of deploying each node in a data distribution system according to an embodiment of the present invention.

The marker 10, the filter 20, the source 30, and the sink 40 can be deployed in various locations in the data distribution system. FIG. 2 is a diagram illustrating examples of deploying each node.

For example, as illustrated in a deployment example 1, the source 30 and the marker 10 may be deployed in an apparatus such as a camera for generating data, and the filter 20 and the sink 40 may be deployed in an apparatus such as a viewer or a video reproduction server for processing data.

For example, as illustrated in a deployment example 2, the source 30 and the marker 10 may be deployed in an apparatus for generating data, the filter 20 may be deployed in an apparatus such as a relay server or a router in the network, and the sink 40 may be deployed in an apparatus for processing data.

For example, as illustrated in a deployment example 3, some functions of the source 30 such as capture of video data may be deployed in an apparatus for generating data, and other functions of the source 30 such as encoding into a format suitable for the marker 10 as well as the marker 10 may be deployed in an apparatus such as a relay server or a router in the network. Further, some functions of the sink 40 such as decoding of video data suitable for the sink 40 may be deployed in an apparatus such as a relay server or a router in the network, and other functions of the sink 40 such as display of video data as well as the filter 20 may be deployed in an apparatus for processing data.

The deployment examples illustrated in FIG. 2 are merely examples and another deployment example is possible.

<Configuration of Marker>

Figure 3:
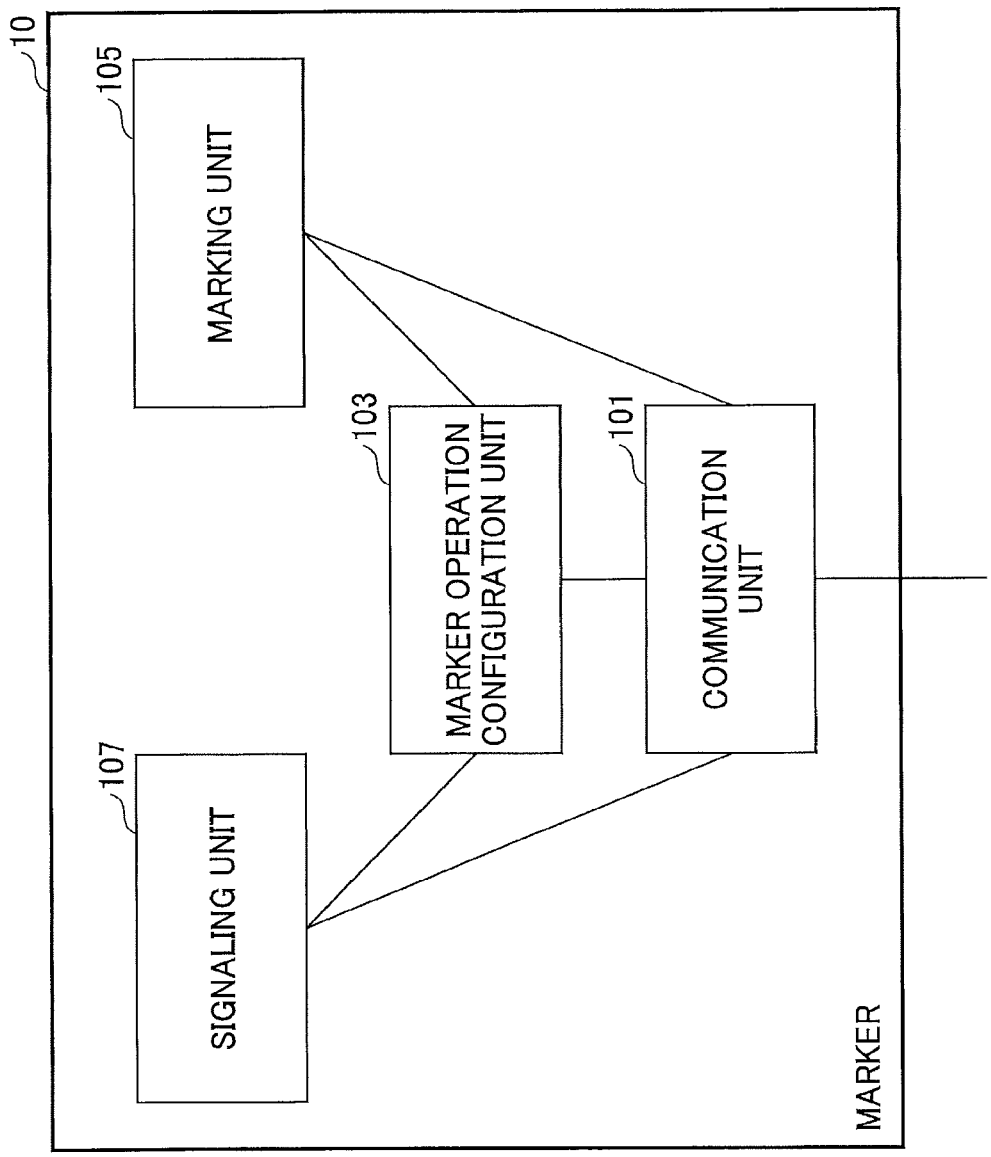
FIG. 3 is a block diagram illustrating a functional configuration of a marker according to an embodiment of the present invention.

FIG. 3 is a block diagram illustrating a functional configuration of the marker 10 according to an embodiment of the present invention. The marker 10 includes a communication unit 101, a marker operation configuration unit 103, a marking unit 105, and a signaling unit 107. The names of these functional units in FIG. 3 are merely examples, and these functional units may be differently termed. For example, the communication unit 101 may be called a reception and transfer unit and the marking unit 105 may be called a supplementary information addition unit.

The communication unit 101 establishes a connection over a communication network and performs data communication with each node. The communication unit 101 receives a packet distributed by the source 30. The communication unit 101 also transfers a packet to which supplementary information is added to the filter 20.

The marker operation configuration unit 103 determines a marking scheme to be performed by the marking unit 105 based on signaling information received from the filter 20, the controller 50, or the like.

The marking unit 105 adds supplementary information to a to-be-distributed packet according to the marking scheme determined by the marker operation configuration unit 103. The supplementary information is determined based on information obtained from the packet. For example, when metadata indicating a luminance component, a color component, a frequency component, a partial image, or the like of image data are added to a header of the packet, the marking unit 105 adds the supplementary information based on the metadata. On the other hand, when such metadata are not added to the packet, the marking unit 105 may add the supplementary information to the packet based on information included in the packet other than a payload, for example, based on a packet size, an RTP (Real-time Transport Protocol) time stamp value, or the like included in the header of the packet.

The signaling unit 107 determines a communication address, a port number, a codec, or the like for transmitting or receiving data according to agreement between a transmitter side and a receiver side. The signaling unit 107 may use a protocol such as a SIP (Session Initiation Protocol), an RTSP (Real Time Streaming Protocol), or the like. The signaling unit 107 may be included in a node external to the marker 10 and connected to the marker 10 via the communication unit 101.

<Configuration of Filter>

Figure 4:
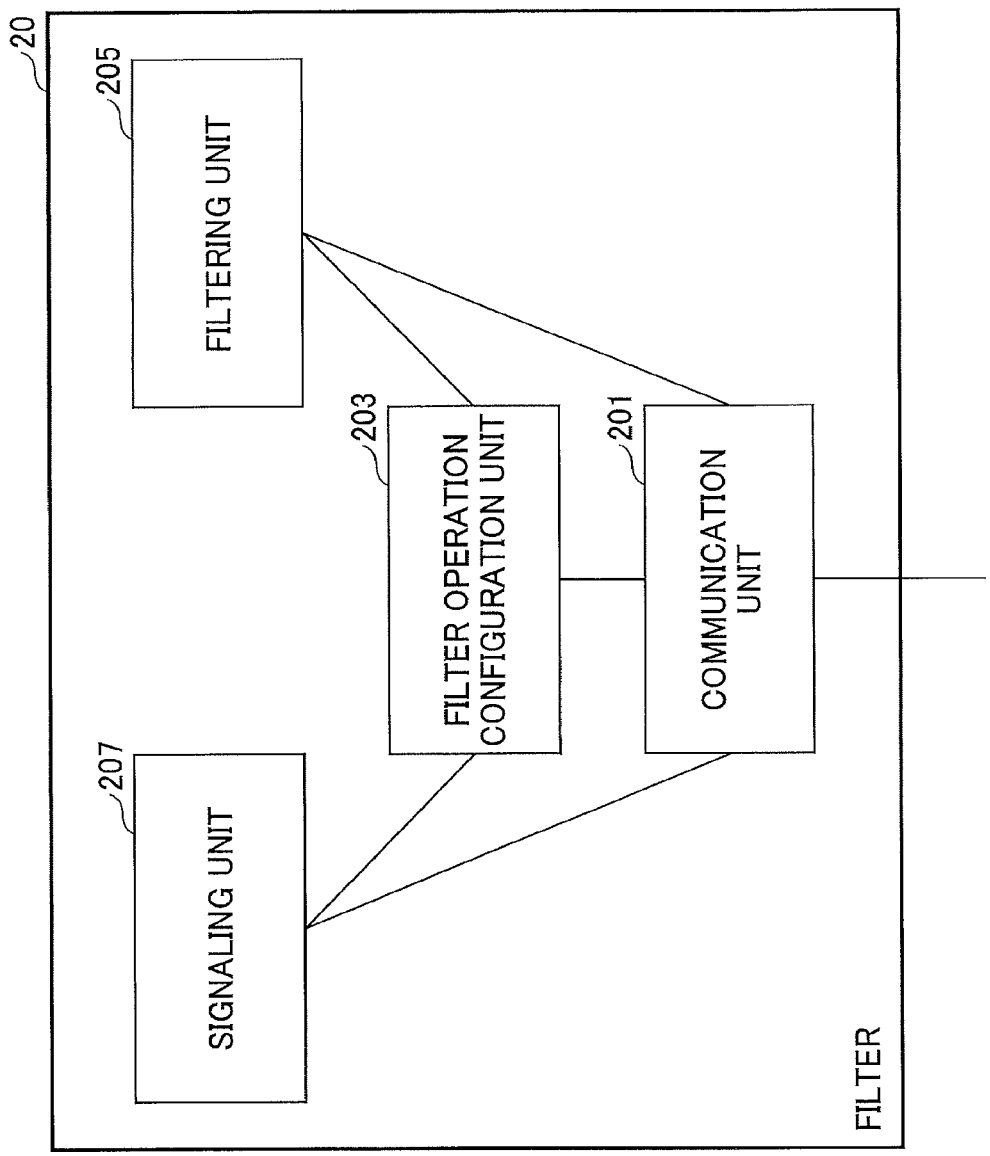
FIG. 4 is a block diagram illustrating a functional configuration of a filter according to an embodiment of the present invention.

FIG. 4 is a block diagram illustrating a functional configuration of the filter 20 according to an embodiment of the present invention. The filter 20 includes a communication unit 201, a filter operation configuration unit 203, a filtering unit 205, and a signaling unit 207. The names of these functional units in FIG. 4 are merely examples, and these functional units may be differently termed. For example, the communication unit 201 may be called a reception and transfer unit and the filtering unit 205 may be called a transfer determination unit.

The communication unit 201 establishes a connection over a communication network and performs data communication with each node. The communication unit 201 receives a packet transferred by the marker 10. The communication unit 201 also transfers a packet to the sink if it is determined that the packet can be transferred to the sink 40.

The filter operation configuration unit 203 determines a filtering scheme to be performed by the filtering unit 205 based on signaling information received from the sink 40, the controller 50, or the like. The filter operation configuration unit 203 may determine a marking scheme corresponding to the filtering scheme and provide the marking scheme to the marker 10.

The filtering unit 205 determines whether a packet can be transferred to the sink 40 according to the filtering scheme determined by the filter operation configuration unit 203. If IL is determined that the packet cannot be transferred, the packet is discarded.

The signaling unit 207 determines a communication address, a port number, a codec, or the like for transmitting or receiving data according to agreement between a transmitter side and a receiver side. The signaling unit 207 may use a protocol such as a SIP, an RTSP, or the like. The signaling unit 207 may be included in a node external to the filter 20 and connected to the filter 20 via the communication unit 201.

<Configuration of Filter>

Figure 5:
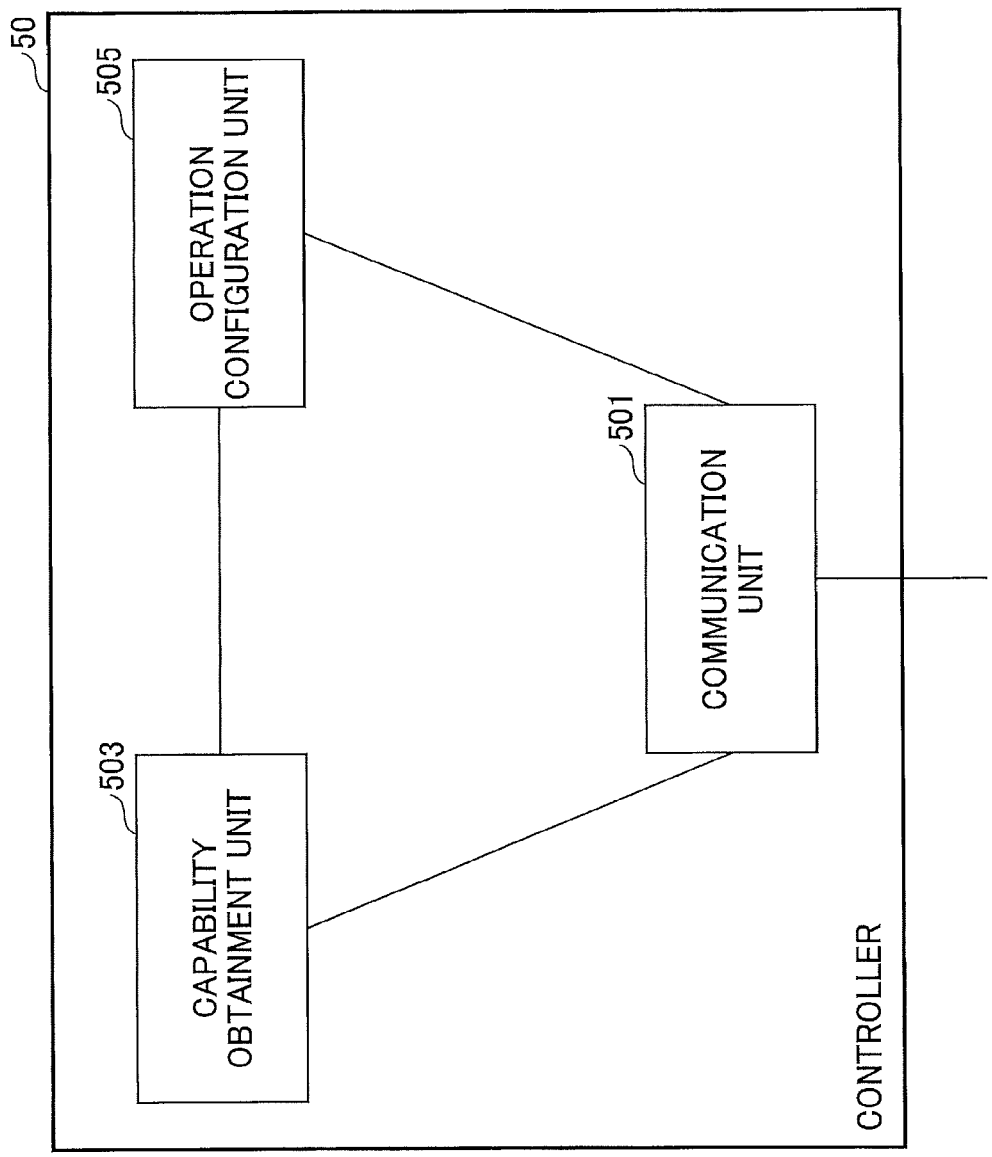
FIG. 5 is a block diagram illustrating a functional configuration of a controller according to an embodiment of the present invention.

FIG. 5 is a block diagram illustrating a functional configuration of the controller 50 according to an embodiment of the present invention. The controller 50 includes a communication unit 501, a capability obtainment unit 503, and an operation configuration unit 505. The names of these functional units in FIG. 5 are merely examples, and these functional units may be differently termed.

The communication unit 501 establishes a connection over a communication network and performs data communication with each node.

The capability obtainment unit 503 obtains a capability (a protocol, a codec, a marking scheme, a filtering scheme, or the like) of each node (each of the source 30, the sink 40, the marker 10, and the filter 20). The capability obtainment unit 503 also obtains a sink request notification indicating data content requested by the sink 40.

The operation configuration unit 505 determines an operation to be performed by each node based on the sink request notification by referring to the capability of each node obtained by the capability obtainment unit 503, and then configures the operation for each node. The operation configuration unit 505 configures a marking scheme for the marker 10 and configures a filtering scheme for the filter 20.

<Example of Extracting Specific Information>

Next, an example of extracting only specific information by using the marker 10 and the filter 20 when image data are distributed from the source 30 to the sink 40 is described. For this purpose, the source 30 needs to decompose the image data into a plurality of components or partial images and add, to each component or each partial image of the decomposed image data, metadata indicating the component or the partial image.

Figure 6:
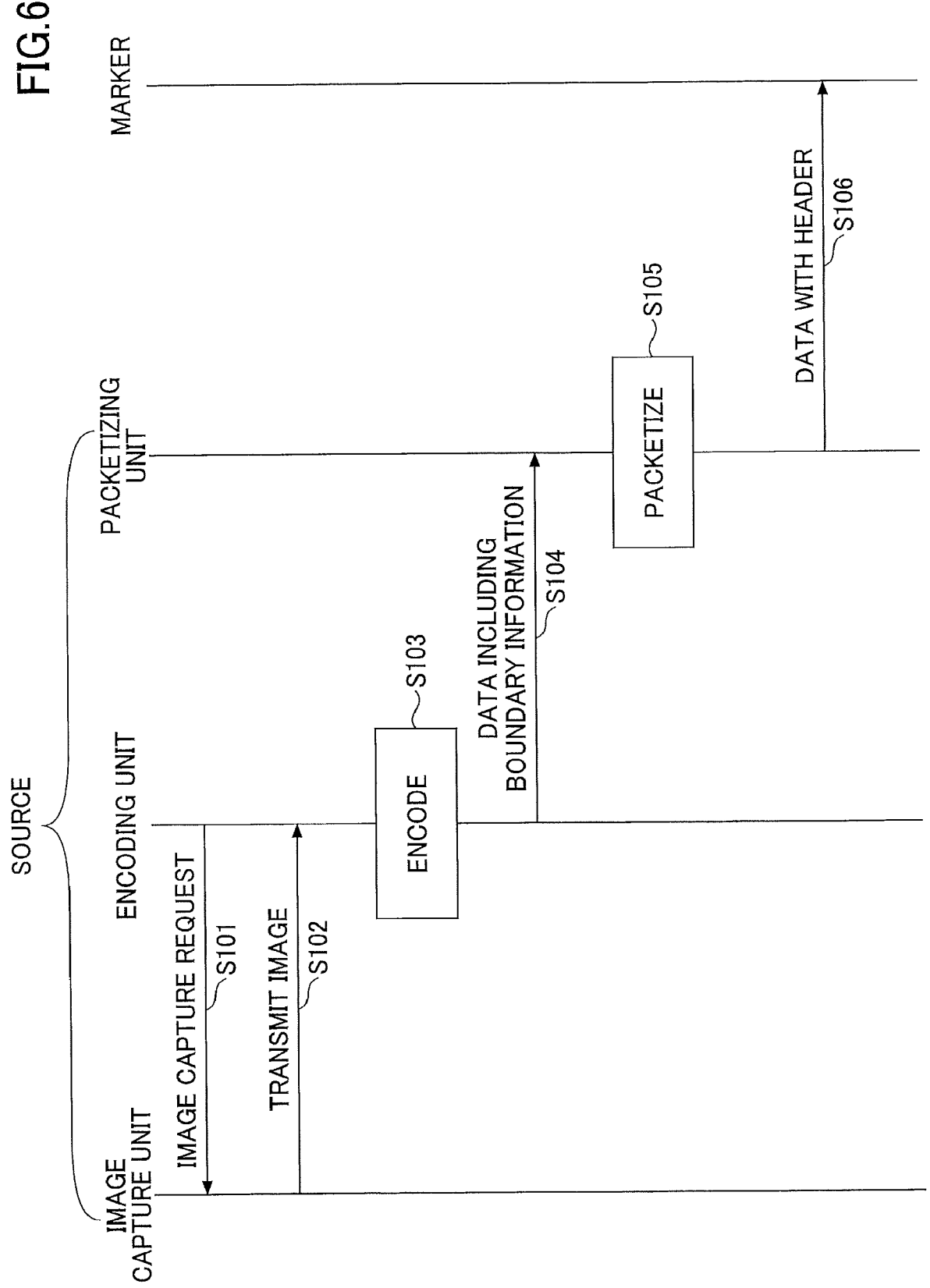
FIG. 6 is a sequence diagram illustrating a process in a source for extracting specific information.

FIG. 6 is a sequence diagram illustrating a process in the source 30 for extracting specific information. It is assumed that the source 30 includes an image capture unit configured to capture an image using a camera or the like, an encoding unit configured to encode the image, and a packetizing unit configured to packetize and transmit the encoded image.

The image capture unit in the source 30 captures image data in response to an image capture request from the encoding unit or the like (S101) and transmits the image data to the encoding unit (S102).

The encoding unit encodes the image data (S103). In one example, the encoding unit can decompose the image data into a Y component, a Cb component, and a Cr component based on luminance information of the image data. In another example, the encoding unit can decompose the image data into a DC component, an AC1 component, and an AC2 component based on frequency information of the image data. In another example, the encoding unit can decompose the image data into SOI, APP, APP1, and so on based on segment information of the image data. In another example, the encoding unit can decompose the imago data into partial images based on coordinate information in pixel space of the image data. In the following description, a component or a partial image of the decomposed image data may be also referred to as a data portion. The encoding unit adds boundary information at a boundary where the type of the data portion changes. The encoding unit transmits the image data to which the boundary information is added to the packetizing unit (S104).

The packetizing unit packetizes each data portion based on the boundary information such that different types of data portions are not mixed into each packet (S105), adds metadata indicating content (a component or the like) of the data portion to a header of a packet such that the content of the data portion can be identified from the header, and transmits the packet (S106).

Figure 7:
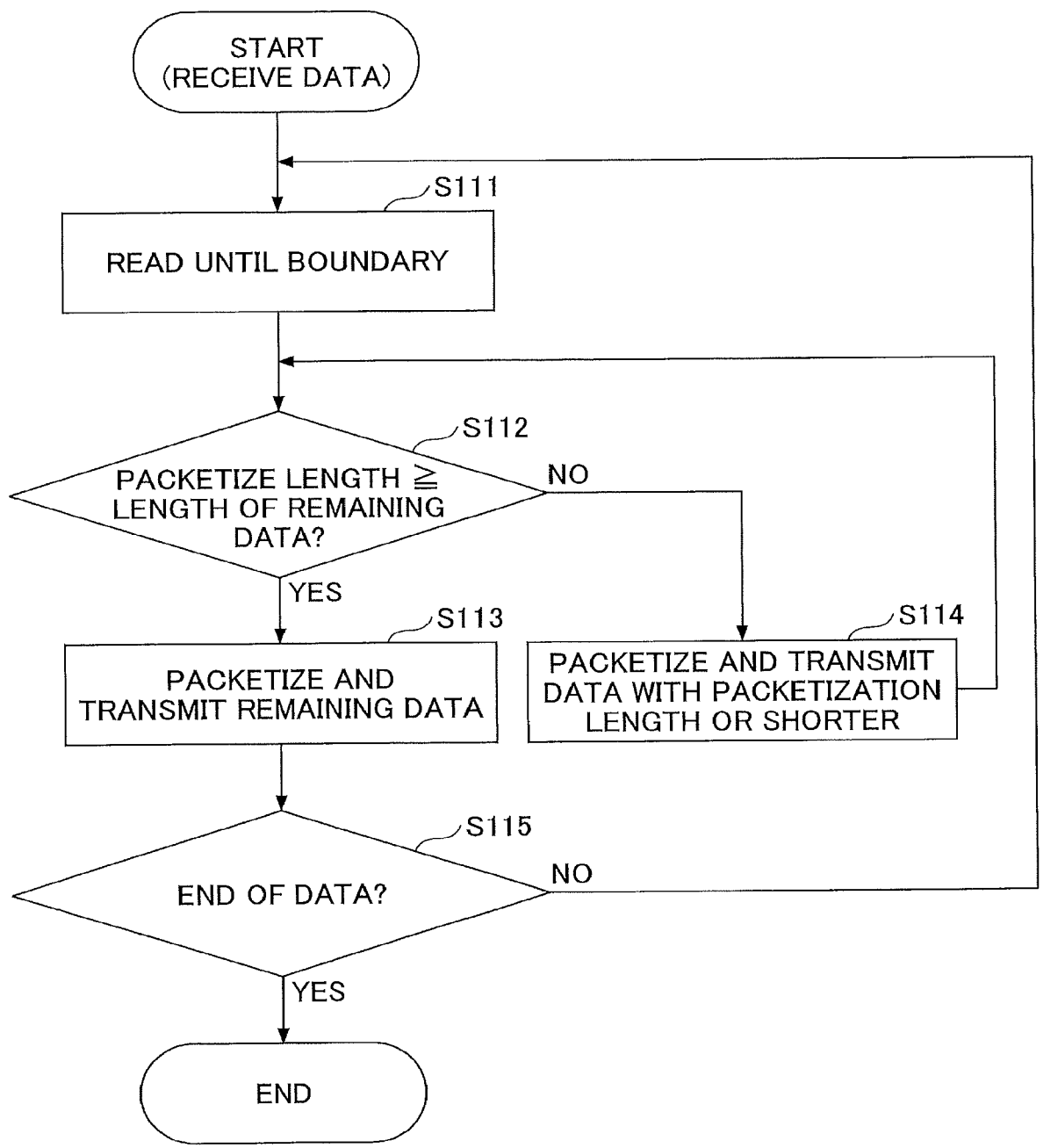
FIG. 7 is a flowchart illustrating a packetizing process in a source.

With reference to FIG. 7, a process in the packetizing unit is further described. FIG. 7 is a flowchart illustrating a packetizing process in the source.

First, the packetizing unit reads, from the image data encoded by the encoding unit, data until arriving at a boundary (S111). When a length of the read data is shorter than or equal to a packetization length (S112: Yes), the packetizing unit packetizes the read data and transmits a packet (S113). When the length of the read data is longer than the packetization length (S112: No), the packetizing unit packetizes data with the packetization length and transmits a packet until a length of the remaining data is shorter than or equal to the packetization length (S114). When the length of the remaining data is shorter than or equal to the packetization length (S112: Yes), the packetizing unit packetizes the remaining data and transmits a packet (S113). When a next boundary is found (S115: No), the foregoing process is repeated. When the entirety of the read data is packetized (S115: Yes), the process is terminated.

It should be noted that the decomposition of image data and the addition of metadata may be performed by the marker 10. For example, when metadata are added by the marker 10, the metadata can be sent to the marking unit 105 in the marker 10 by using a memory shared between programs or the like.

Figure 8:
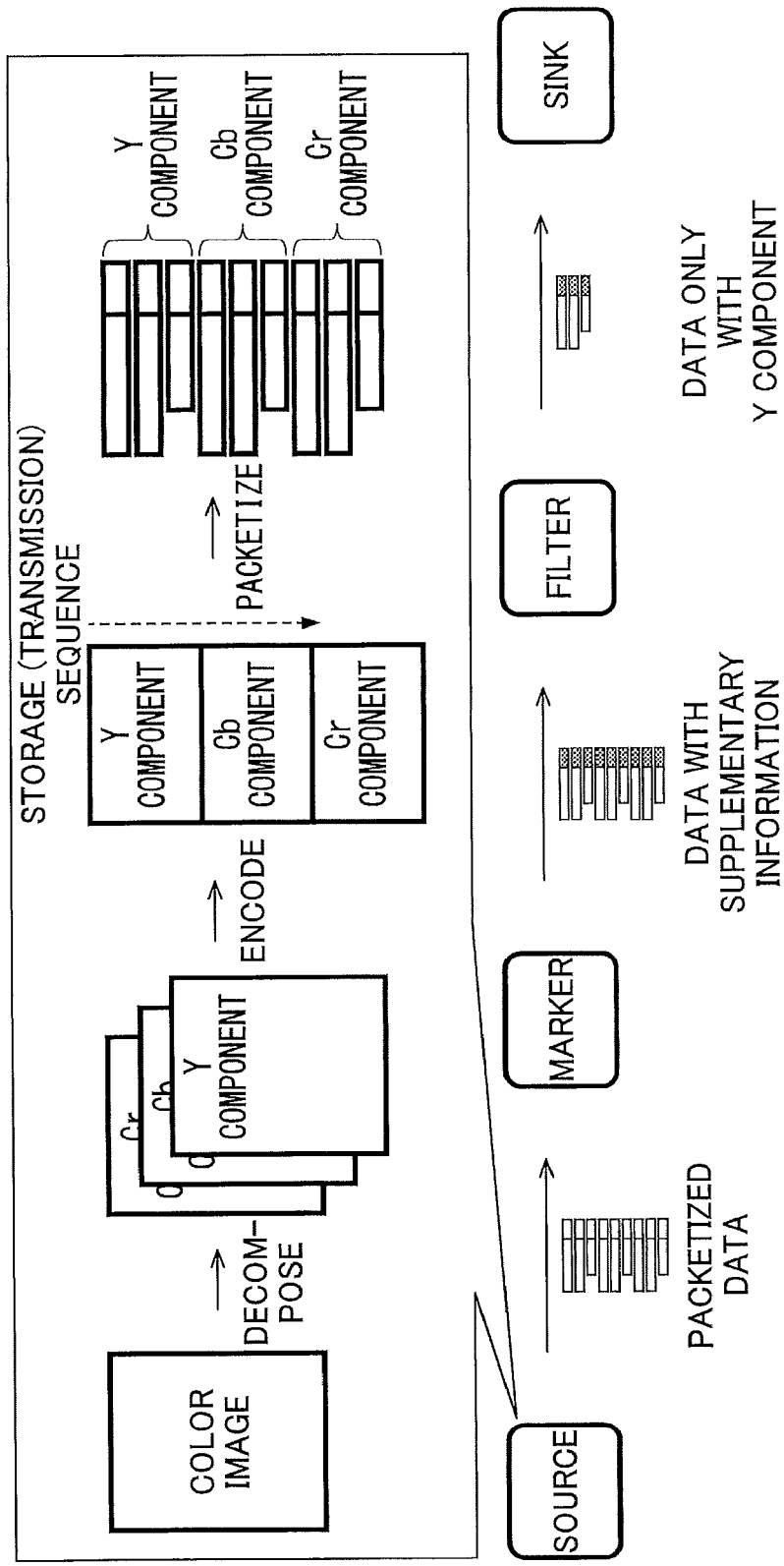
FIG. 8 is a schematic diagram illustrating how a data portion corresponding to a luminance component is extracted.

FIG. 8 is a schematic diagram illustrating how a data portion corresponding to a luminance component is extracted by the marker 10 and the filter 20.

The source 30 decomposes image data into a Y component, a Cb component, and a Cr component based on luminance information of the image data and packetizes each component, as described above. Metadata indicating content of the component are added to a header of a packet.

The marker 10 adds supplementary information based on the metadata added by the source 30, such that the filter 20 can identify the component.

The filter 20 extracts only the Y component and transmits the Y component to the sink 40.

Figure 9:
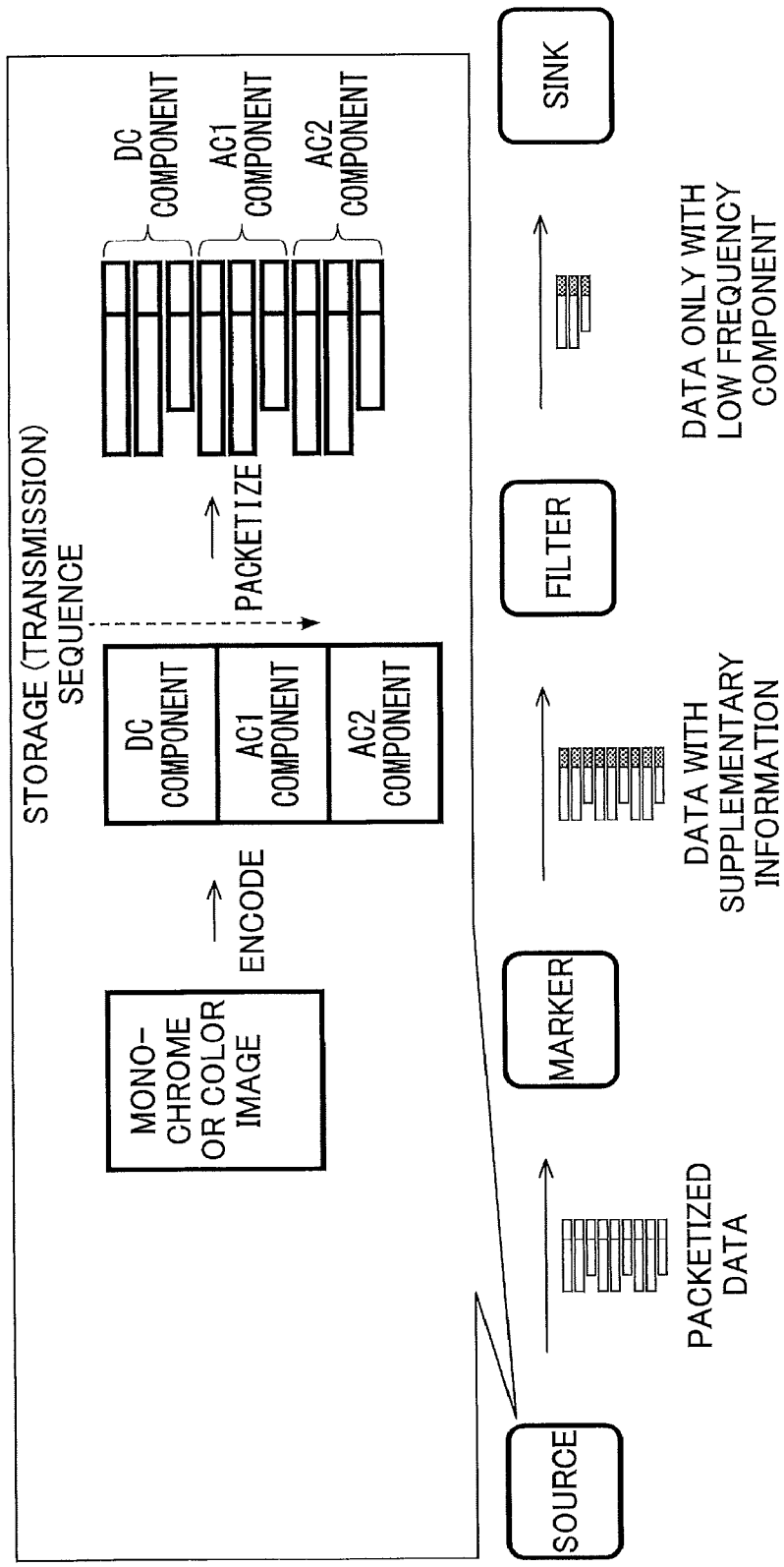
FIG. 9 is a schematic diagram illustrating how a data portion corresponding to a specific frequency component is extracted.

FIG. 9 is a schematic diagram illustrating how a data portion corresponding to a specific frequency component is extracted by the marker 10 and the filter 20.

The source 30 decomposes image data into a DC component, an AC1 component, and an AC2 component based on frequency information of the image data and packetizes each component, as described above. Metadata indicating content of the component are added to a header of a packet.

The marker 10 adds supplementary information based on the metadata added by the source 30, such that the filter 20 can identify the component.

The filter 20 extracts only a low frequency component such as a DC component and transmits the low frequency component to the sink 40.

Figure 10:
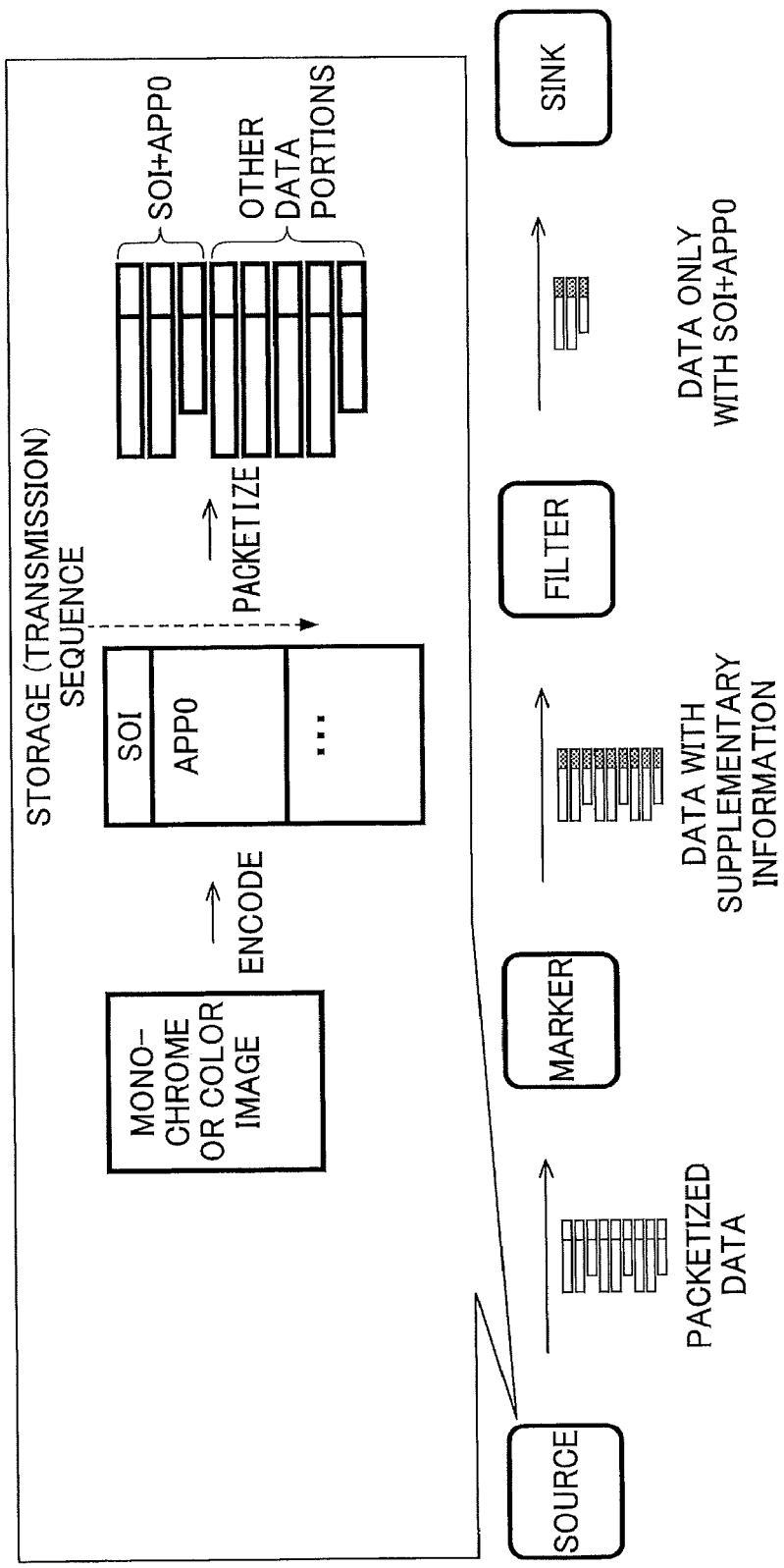
FIG. 10 is a schematic diagram illustrating how a data portion corresponding to a thumbnail image is extracted.

FIG. 10 is a schematic diagram illustrating how a data portion corresponding to a thumbnail image is extracted by the marker 10 and the filter 20.

The source 30 decomposes image data into SOI, APP0, APP1, and so on based on segment information of the image data and packetizes each data portion of the decomposed image data, as described above. Metadata indicating content of the data portion are added to a header of a packet.

The marker 10 adds supplementary information based on the metadata added by the source 30, such that the filter 20 can identify data portions including SOI+APP0 and the other data portions.

The filter 20 extracts only SOI+APP0 and transmits the SOI+APP0 to the sink 40.

Figure 11:
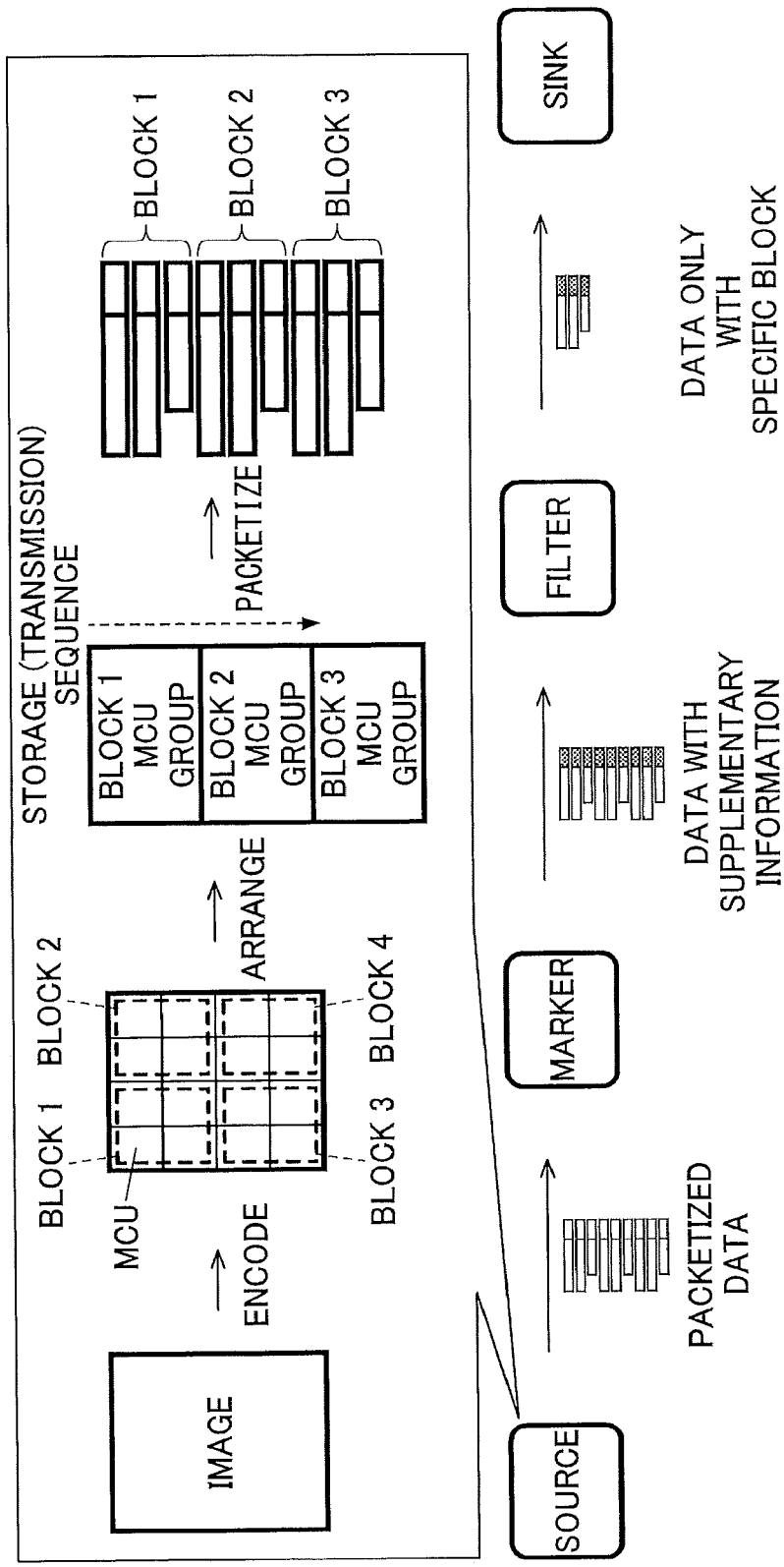
FIG. 11 is a conceptual diagram illustrating how a data portion corresponding to a partial image is extracted.

FIG. 11 is a schematic diagram illustrating how a data portion corresponding to a partial image is extracted by the marker 10 and the filter 20.

The source 30 decomposes image data into a plurality of blocks based on coordinate information in pixel space of the image data and packetizes each block of the decomposed image data, as described above. Each block may be formed by a collection of MCUs (Minimum Coded Units), each of which is a minimum coding unit. Metadata indicating content of the block are added to a header of a packet.

The marker 10 adds supplementary information based on the metadata added by the source 30, such that the filter 20 can identify the block.

The filter 20 extracts only a specific block and transmits the specific block to the sink 40.

Since the source 30 decomposes data and sequentially transmits data portions to the marker 10 according to a predetermined rule as described above, the marker 10 can sequentially transfer the data portions to the sink 40 according to a predetermined rule.

<First Exemplary Sequence in Data Distribution System>

Next, operations of the marker 10 and the filter 20 in the data distribution system are described in detail.

Figure 12:
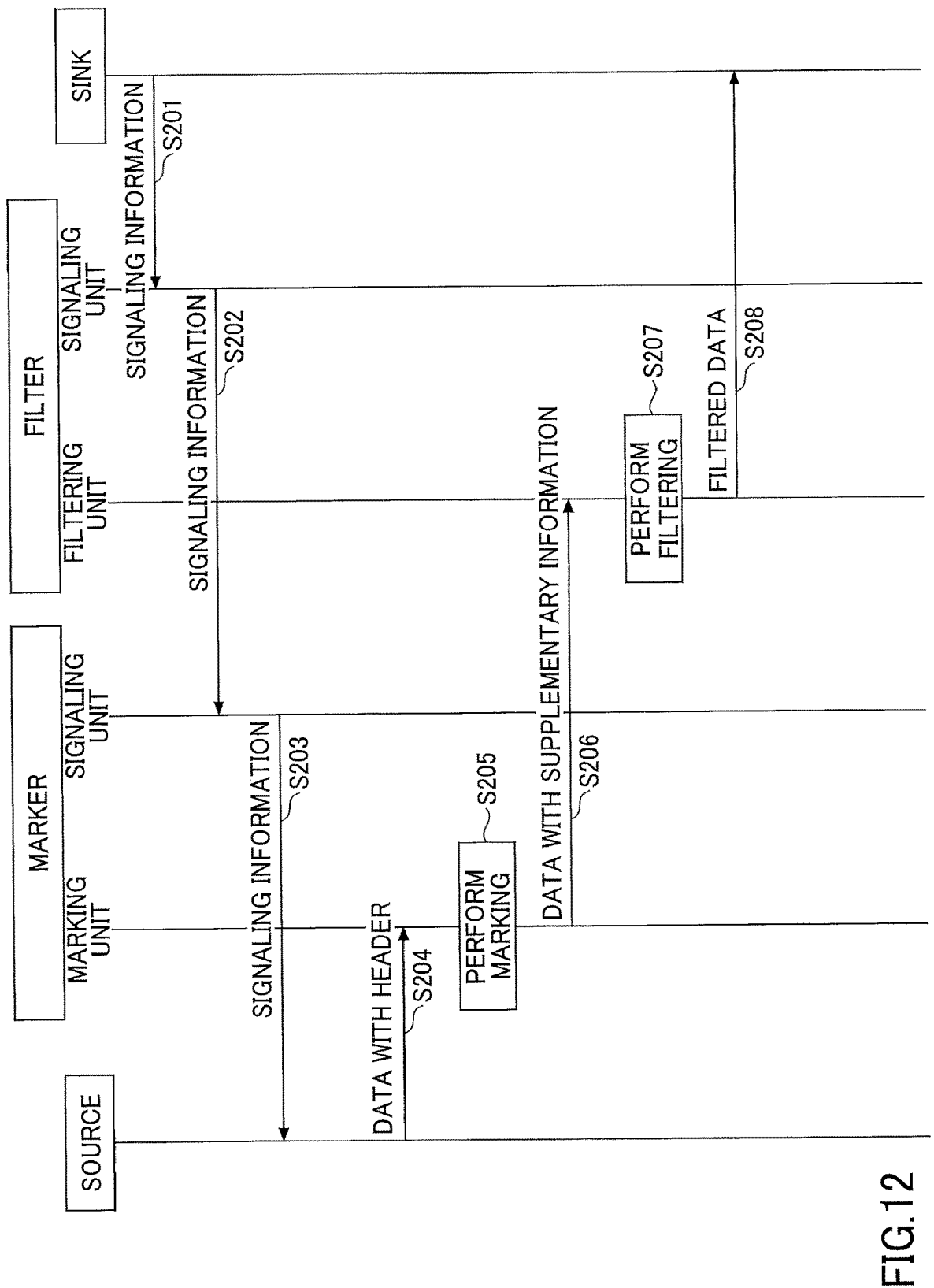
FIG. 12 is a first exemplary sequence in a data distribution system.

FIG. 12 is a first exemplary sequence in the data distribution system, when a marking scheme in the marker 10 and a filtering scheme in the filter 20 are configured in advance.

The sink 40 transmits signaling information including a connection-target URL (Uniform Resource Locator), a data reception address, and a port to the filter 20 (S201). The connection-target URL is a URL of the source 30, and the data reception address and the port are an IP (Internet Protocol) address and a port number of the sink 40 for receiving data. The signaling unit 207 in the filter 20 transmits the signaling information received from the sink 40 to the marker 10 (S202). The signaling unit 107 in the marker 10 transmits the signaling information received from the filter 20 to the source 30 (S203).

The source 30 packetizes each data portion of image data, adds metadata to a header of a packet such that content (a component or the like) of the data portion can be identified from the header, and transmits the packet (S204), as described with reference to FIGS. 6-11, for example.

The marking unit 105 in the marker 10 adds supplementary information based on information obtained from the header of the packet (S205).

Figure 13:
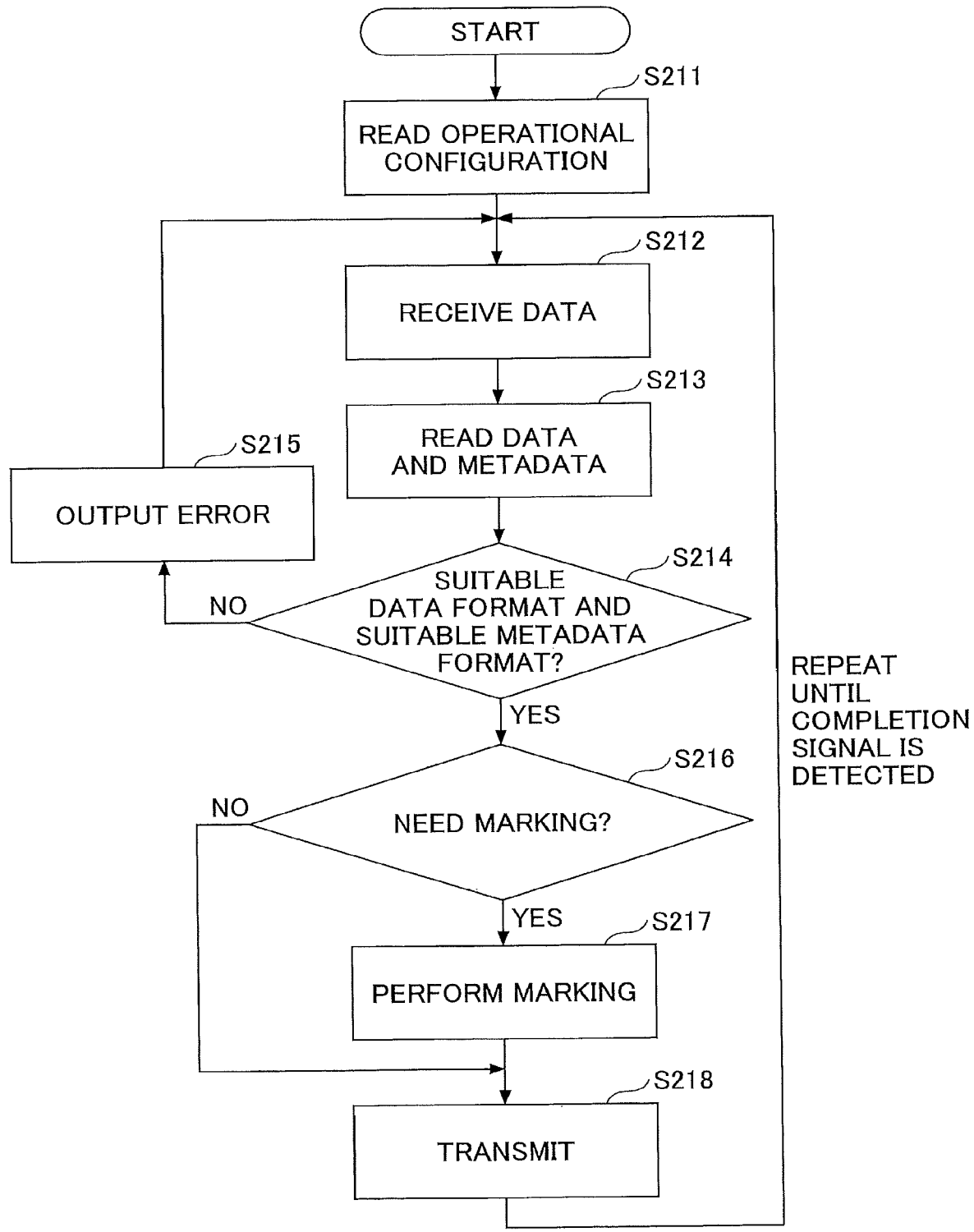
FIG. 13 is a flowchart illustrating a marking process in a marker (in the case where metadata can be obtained).

With reference to FIG. 13, the step S205 is described in detail. FIG. 13 is a flowchart illustrating a marking process in the marking unit 105 in the marker 10.

The marking unit 105 obtains a marking scheme configured by the marker operation configuration unit 103 (S211). In the example illustrated in FIG. 12, the marking scheme is determined in advance. For example, the marking unit 105 obtains a marking scheme of marking only a Y component.

The marking unit 105 obtains data received by the communication unit 101 (S212) and reads the data and metadata (S213). The marking unit 105 determines whether the read data and the metadata can be handled according to the marking scheme (S214). When the data and the metadata cannot be handled according to the marking scheme (S214: No), for example, when the metadata indicates a DC component regardless of the marking scheme of marking only a Y component, the marking unit 105 outputs an error (S215).

When the data and the metadata can be handled according to the marking scheme (S214: Yes), the marking unit 105 determines whether to perform marking based on the metadata (S216). When marking is needed (S216: Yes), the marking unit 105 adds supplementary information (S217) and transmits the data (S218). When marking is not needed (S216: No), the marking unit 105 transmits the data without adding supplementary information (S210).

Figure 14:
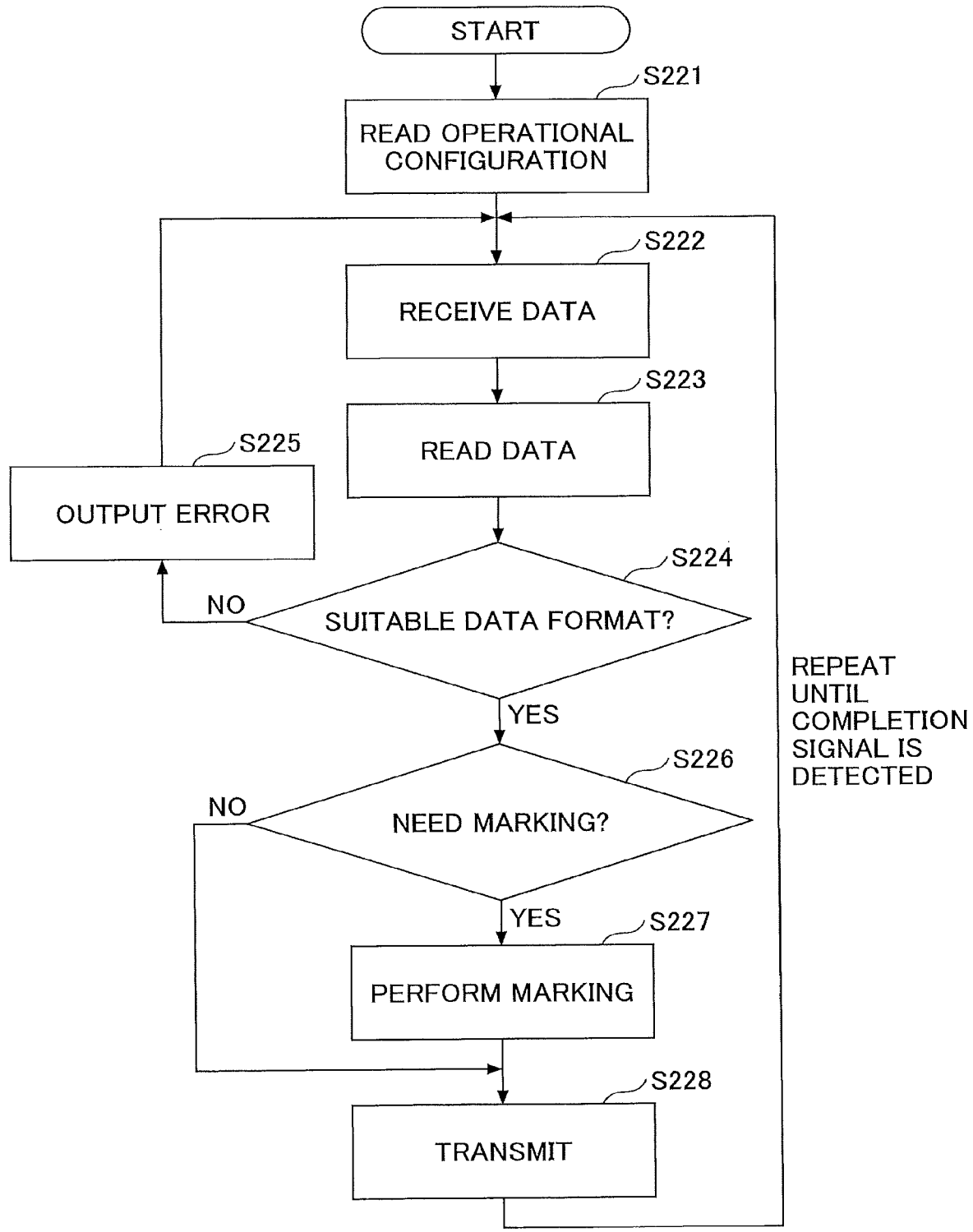
FIG. 14 is a flowchart illustrating a marking process in a marker (in the case where metadata cannot be obtained).

With reference to FIG. 14, another example of the step S205 is described in detail. FIG. 14 is a flowchart illustrating a marking process in the marking unit 105 in the marker 10, when metadata cannot be obtained. When metadata cannot be obtained, the marking unit 105 can perform marking based on a packet size, a time stamp value, or the like.

The marking unit 105 obtains a marking scheme configured by the marker operation configuration unit 103 (S221). In the example illustrated in FIG. 12, the marking scheme is determined in advance. For example, the marking unit 105 obtains a marking scheme of marking only a packet with a size exceeding 1000 bytes, a marking scheme of marking a packet with a size twice or more larger than that of an immediately preceding packet, or a marking scheme of marking a packet when a quotient obtained by dividing an RTP time stamp value by 3600 is an even number.

The marking unit 105 obtains data received by the communication unit 101 (S222) and reads the data (S223). The marking unit 105 determines whether the read data can be handled according to the marking scheme (S224). When the data cannot be handled according to the marking scheme (S224: No), for example, when an RTP time stamp value is not found regardless of the marking scheme that is based on the RTP time stamp value, the marking unit 105 outputs an error (S225).

When the data can be handled according to the marking scheme (S224: Yes), the marking unit 105 determines whether to perform marking based on a packet size, a time stamp value, or the like (S226). In an example where the marking scheme of marking a packet with a size twice or more larger than that of an immediately preceding packet is used, when a packet with a size of 1400 bytes is initially received, the marking unit 105 does not perform marking. When a packet with a size of 1400 bytes is subsequently received, the marking unit 105 does not perform marking. When a packet with a size of 100 bytes is subsequently received, the marking unit 105 does not perform marking. When a packet with a size of 1400 bytes is subsequently received, the marking unit 105 performs marking. In another example where the marking scheme of marking a packet when a quotient obtained by dividing an RTP time stamp value by 3600 is an even number is used, when a packet with an RTP time stamp value of 10000 is received, the marking unit 105 performs marking. When a packet with an RTP time stamp value of 13600 is received, the marking unit does not perform marking. When marking is needed (S226: Yes), the marking unit 105 adds supplementary information (S227) and transmits the data (S228). When marking is not needed (S226: No), the marking unit 105 transmits the data without adding supplementary information (S228).

The marking unit 105 transfers the data to which the supplementary information is added to the filter 20 via the communication unit 101 (S206 in FIG. 12).

The filtering unit 205 in the filter 20 determines whether to transfer the data to the sink 40 based on the supplementary information (S207 in FIG. 12).

Figure 15:
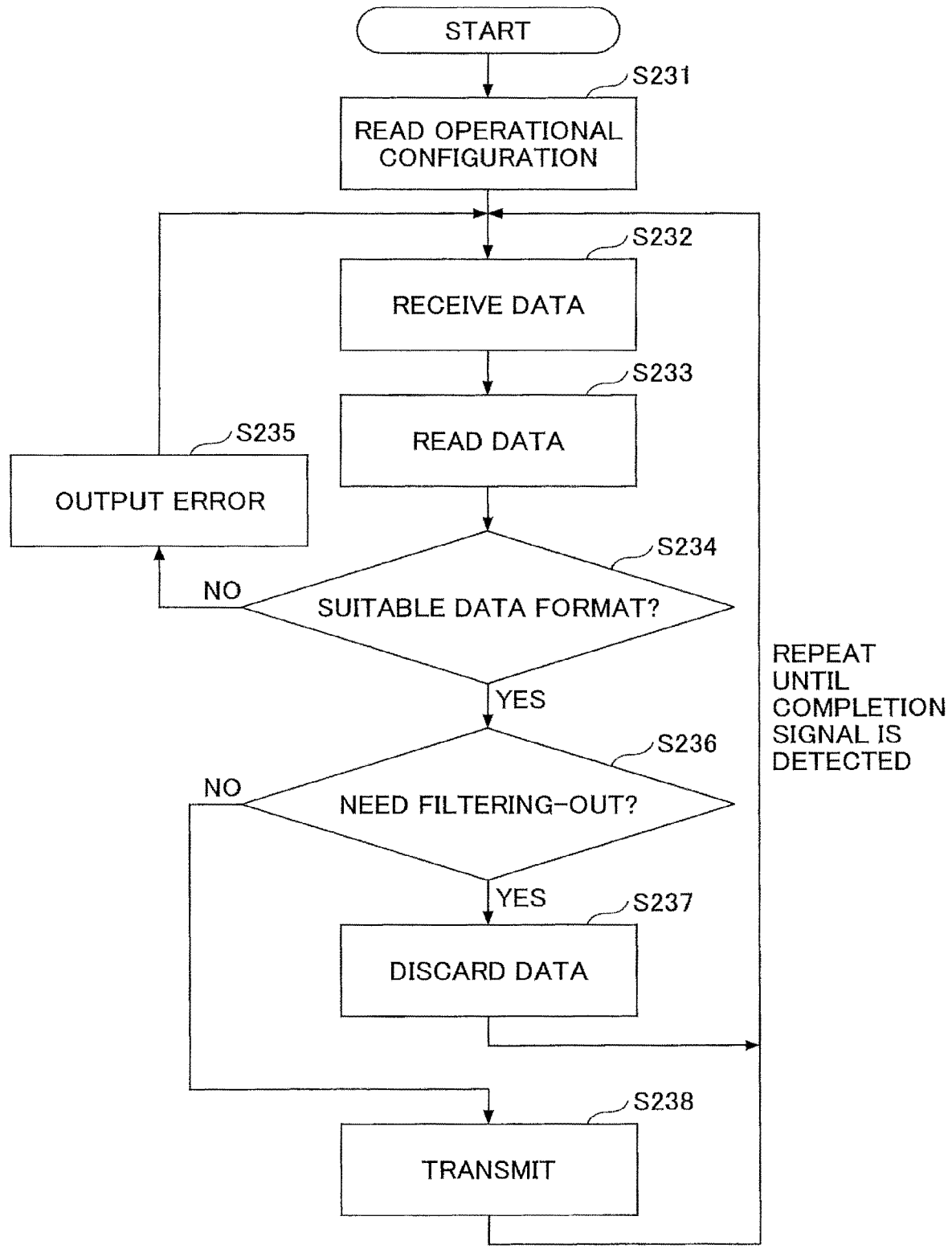
FIG. 15 is a flowchart illustrating a filtering process in a filter.

With reference to FIG. 15, the step S207 is described in detail. FIG. 15 is a flowchart illustrating a filtering process in the filtering unit 205 in the filter 20.

The filtering unit 205 obtains a filtering scheme configured by the filter operation configuration unit 203 (S231). In the example illustrated in FIG. 12, the filtering scheme is determined in advance. For example, the filtering unit 205 obtains a filtering scheme of transferring only a Y component without transferring a Cr component and a Cb component.

The filtering unit 205 obtains data received by the communication unit 201 (S232) and reads the data (S233). The filtering unit 205 determines whether the read data can be handled according to the filtering scheme (S234). When the data cannot be handled according to the filtering scheme (S234: No), for example, when supplementary information added to the data cannot be recognized, the filtering unit 205 outputs an error (S235).

When the data can be handled according to the filtering scheme (S234: Yes), the filtering unit 205 determines whether to perform filtering (filtering-out) based on the supplementary information (S236). When filtering (filtering-out) is needed (S236: Yes), the filtering unit 205 discards the data (S237). When filtering (filtering-out) is not needed (S236: No), the filtering unit 205 determines that the data can be transferred (S238).

The filtering unit 205 transfers a packet to the sink 40 if the data can be transferred.

<Second Exemplary Sequence in Data Distribution System>

Figure 16:
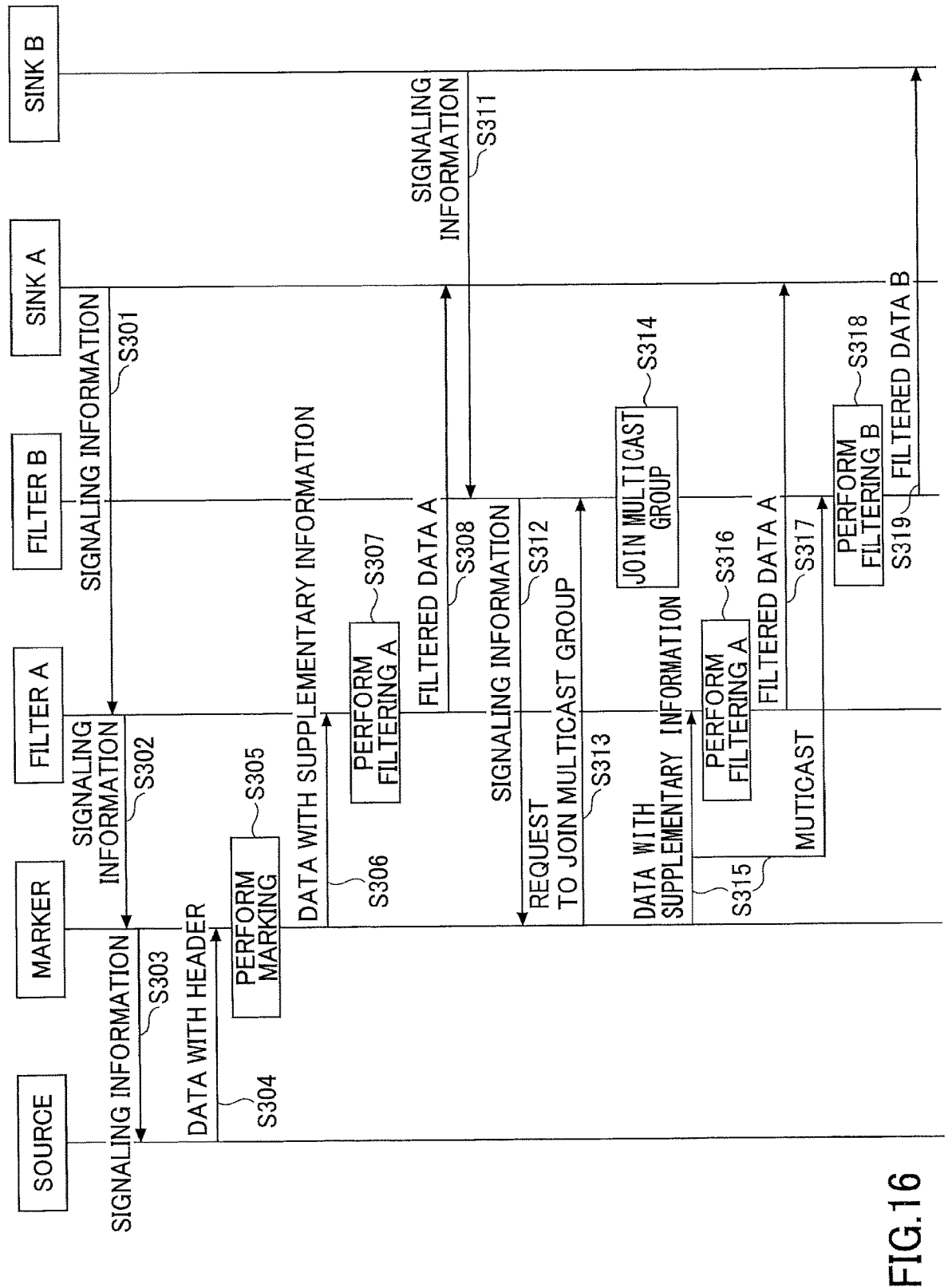
FIG. 16 is a second exemplary sequence in a data distribution system.

FIG. 16 illustrates a second exemplary sequence in the data distribution system including a plurality of sinks and a plurality of filters. In this example, a marking scheme in the marker 10 and filtering schemes in the filters 20A and 20B are determined in advance. In the example described below, it is assumed that the marker 10 marks a Y component, a Cr component, and a Cb component, the filter A20 transfers only the marked Y component, and the filter B20 transfers the marked Y component and the marked Cr component.

The sink A40 transmits signaling information including a connection-target URL, a data reception address, and a port to the filter A20 (S301). The signaling unit 207 in the filter A20 transmits the signaling information received from the sink A40 to the marker 10 (S302). The signaling unit 107 in the marker 10 transmits the signaling information received from the filter A20 to the source 30 (S303).

The source 30 packetizes each data portion of image data, adds metadata to a header of a packet such that content of the data portion can be identified from the header, and transmits the packet (S304), as described with reference to FIGS. 6-11, for example. In this example, metadata are added such that a Y component, a Cr component, and a Cb component can be identified from the header.

The marking unit 105 in the marker 10 adds supplementary information indicating a Y component, a Cr component, or a Cb component based on the metadata (S305). The marking unit 105 transfers the data to which the supplementary information is added to the filter A20 via the communication unit 101 (S306).

The filtering unit 205 in the filter A20 determines whether to transfer the data to the sink A40 based on the supplementary information (S307). The filtering unit 205 in the filter A20 transfers only a Y component and discards a Cr component and a Cb component based on the supplementary information added by the marker 10 (S308).

When the sink B40 requests the same source 30 to distribute data, the sink B40 transmits signaling information including a connection-target URL, a data reception address, and a port to the filter B20 (S311). The signaling unit 207 in the filter B20 transmits the signaling information received from the sink B40 to the marker 10 (S312). Since the marker 10 can recognize from the signaling information that the data have been already received from the source 30 of the connection-target URL, the marker 10 requests the filter B20 to join a multicast group (S313), and then the filter B20 joins the multicast group (S314). Alternatively, the filter B20 may directly join the multicast group by sharing the signaling information between the filter A20 and the filter B20, without transmitting the signaling information from the filter B20 to the marker 10.

The marking unit 105 in the marker 10 adds supplementary information to the data received from the source 30, and transfers the data to which the supplementary information is added to the filter A20 via the communication unit 101 (S315). Further, the marking unit 105 simultaneously multicasts the same data to the filter B20.

The filtering unit 205 in the filter A20 determines whether to transfer the data to the sink A40 based on the supplementary information (S316). The filtering unit 205 in the filter A20 transfers only a Y component and discards a Cr component and a Cb component based on the supplementary information added by the marker 10 (S317).

The filtering unit 205 in the filter B20 determines whether to transfer the data to the sink B40 based on the supplementary information (S318). The filtering unit 205 in the filter B20 transfers only a Y component and a Cr component and discards a Cb component based on the supplementary information added by the marker 10 (S319).

<Third Exemplary Sequence in Data Distribution System>

Figure 17:
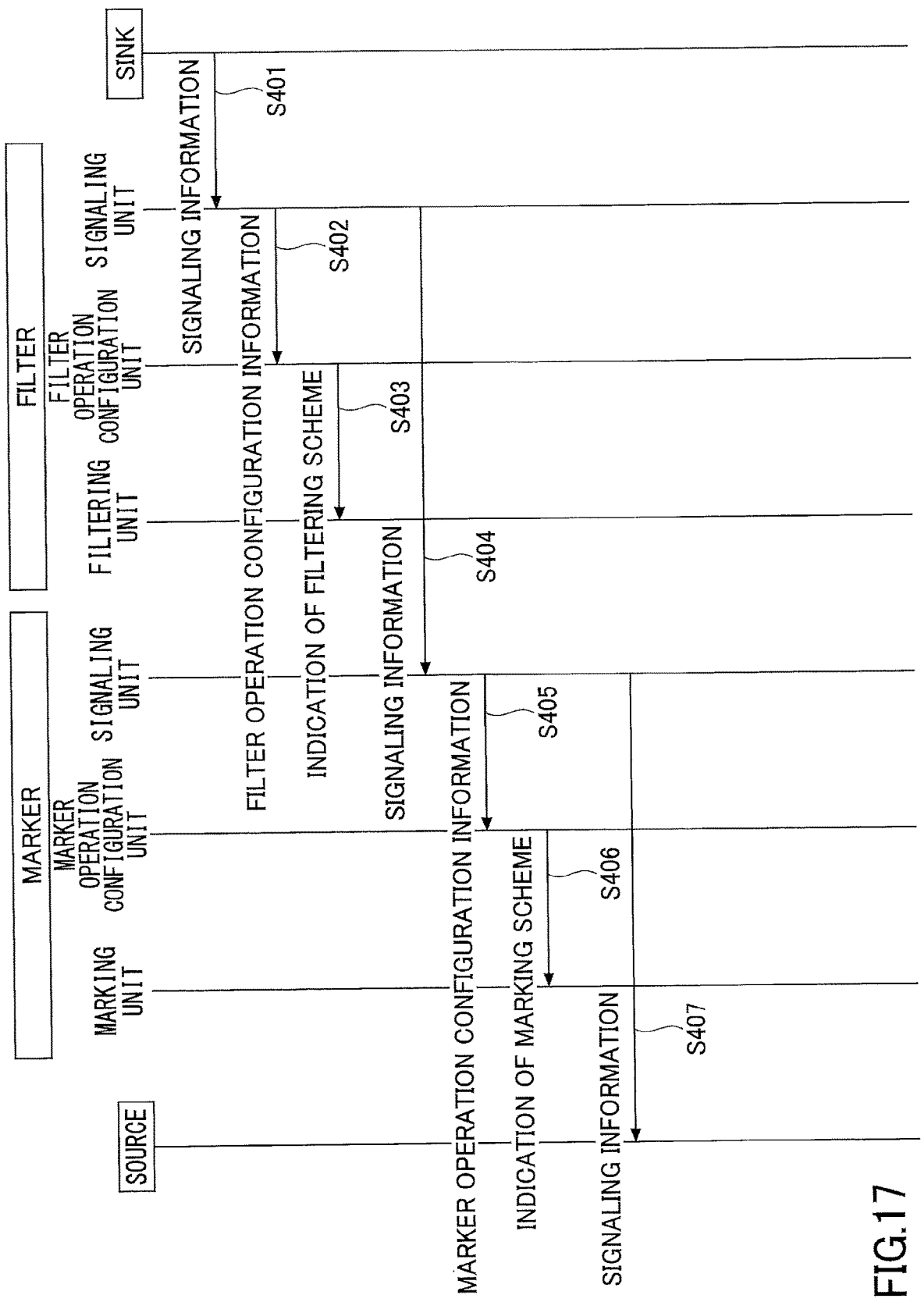
FIG. 17 is a third exemplary sequence in a data distribution system.

FIG. 17 illustrates a third exemplary sequence in the data distribution system, where a marking scheme in the marker 10 and a filtering scheme in the filter 20 are included in signaling information.

The sink 40 transmits signaling information including a connection-target URL, a data reception address, and a port and further including a marking scheme and a filtering scheme to the filter 20 (S401). For example, the sink 40 transmits a marking scheme of marking only a Y component and a filtering scheme of dropping an unmarked packet to the filter 20.

The signaling unit 207 in the filter 20 provides the filtering scheme included in the signaling information to the filter operation configuration unit 203 (S402). The filter operation configuration unit 203 determines the filtering scheme to be performed by the filtering unit 205 and provides the filtering scheme to the filtering unit 205 (S403).

The signaling unit 207 in the filter 20 transmits the marking scheme included in the signaling information to the marker 10 (S404).

The signaling unit 107 in the marker 10 provides the marking scheme included in the signaling information to the marker operation configuration unit 103 (S405). The marker operation configuration unit 103 determines the marking scheme to be performed by the marking unit 105 and provides the marking scheme to the marking unit 105 (S406). The signaling unit 107 in the marker 10 transmits the signaling information received from the filter 20 to the source 30 (S407).

In the following steps, marking and filtering are performed as described in the steps S204-S208 illustrated in FIG. 12.

<Fourth Exemplary Sequence in Data Distribution System>

Figure 18:
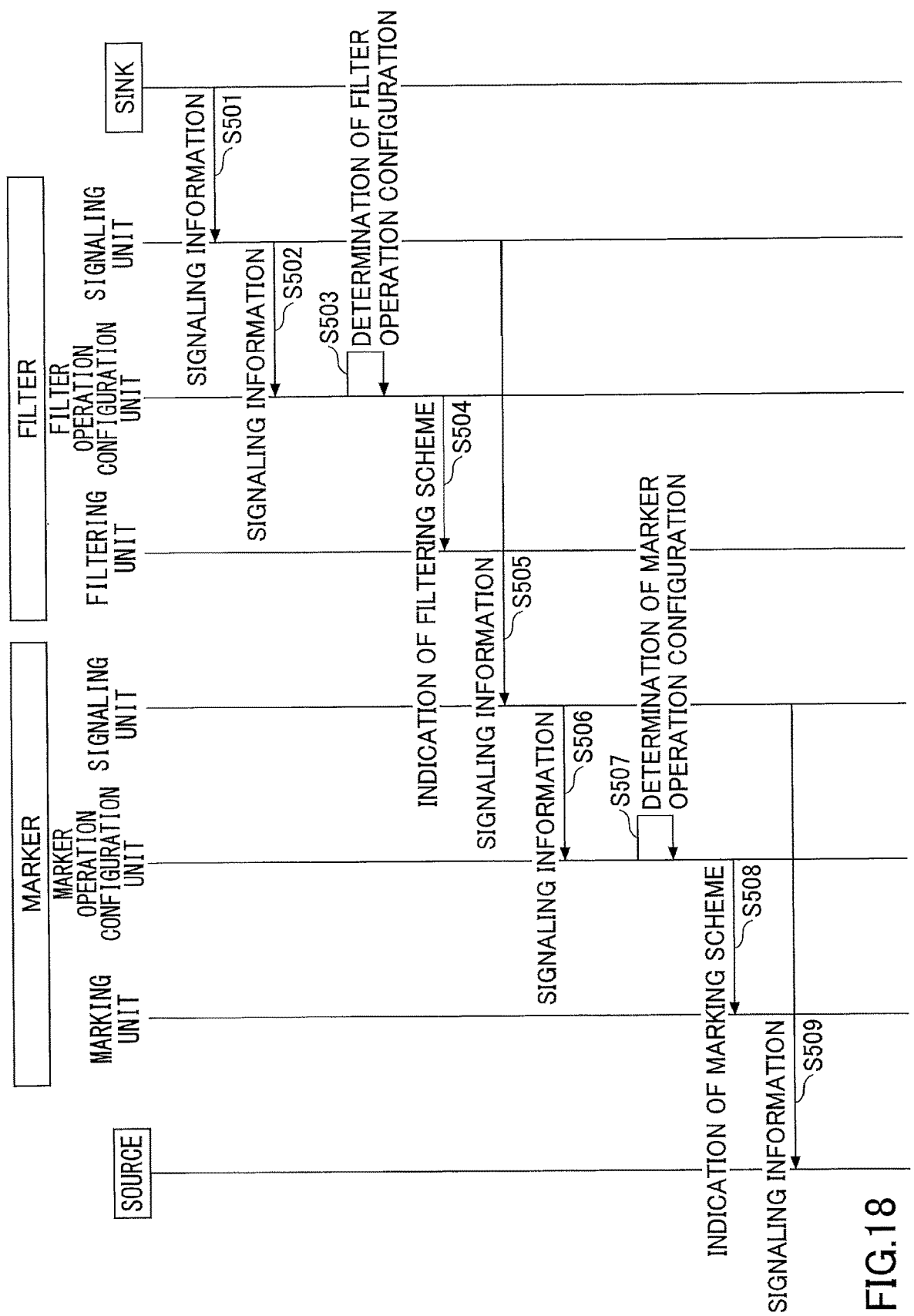
FIG. 18 is a fourth exemplary sequence in a data distribution system.

FIG. 18 illustrates a fourth exemplary sequence in the data distribution system, where a marking scheme in the marker 10 and a filtering scheme in the filter 20 are determined based on signaling information.

The sink 40 transmits signaling information including a connection-target URL, a data reception address, and a port and further including information (a request data type)

indicating a type of data to be distributed to the filter 20 (S501). For example, the request data type represents a type of data which the sink 40 requests the source 30 to distribute. For example, the request data type may represent that only a Y component of JPEG-encoded data is to be distributed.

The signaling unit 207 in the filter 20 provides the signaling information to the filter operation configuration unit 203 (S502). The filter operation configuration unit 203 determines a marking scheme and a filtering scheme based on the request data type in the signaling information (S503). For example, the filter operation configuration unit 203 determines a marking scheme of marking only a Y component and a filtering scheme of dropping an unmarked packet. The filter operation configuration unit 203 provides the filtering scheme to the filtering unit 205 (S504).

The filtering unit 207 in the filter 20 includes the marking scheme determined by the filter operation configuration unit 203 in signaling information and transmits the signaling information to the marker 10 (S505).

The signaling unit 107 in the marker 10 provides the marking scheme included in the signaling information to the marker operation configuration unit 103 (S506). The marker operation configuration unit 103 determines the marking scheme to be performed by the marking unit 105 (S507) and provides the marking scheme to the marking unit 105 (S508). While the marking scheme is determined by the filter 20 and provided to the marker 10 in this embodiment, the marking scheme may be determined by the marker operation configuration unit 103 in the marker 10 based on the request data type in the signaling information.

The signaling unit 107 in the marker 10 transmits the signaling information received from the filter 20 to the source 30 (S509).

In the following steps, marking and filtering are performed as described in the steps S204-S208 illustrated in FIG. 12.

<Fifth Exemplary Sequence in Data Distribution System>

Figure 19:
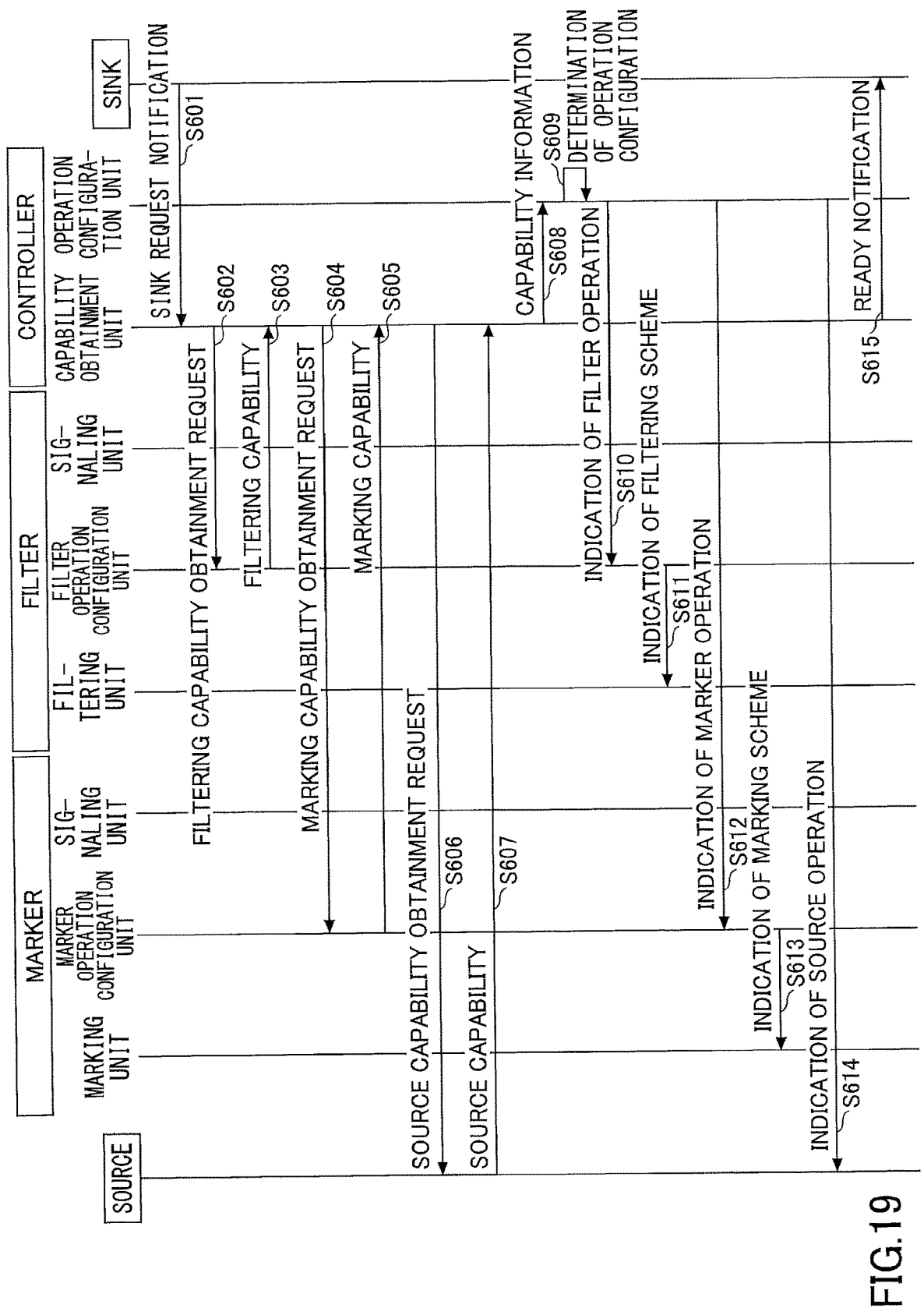
FIG. 19 is a fifth exemplary sequence in a data distribution system.

FIG. 19 illustrates a fifth exemplary sequence in the data distribution system including the controller 50. The controller 50 obtains a capability of each node and determines an operation to be performed by each node based on a sink request notification indicating data content requested by the sink 40.

The sink 40 transmits a sink request notification including a connection-target URL, a data reception address, and a port and further including a request data type to the controller 50 (S601). For example, the request data type represents a type of data which the sink 40 requests the source 30 to distribute. For example, the request data type may represent that only a Y component of JPEG-encoded data is to be distributed.

The capability obtainment unit 503 in the controller 50 transmits a filtering capability obtainment request for obtaining a filter scheme which can be configured in the filter operation configuration unit 203 in the filter 20 (S602) and obtains a filtering capability indicating a configurable filter scheme (S603). For example, the filtering capability includes whether filtering can be implemented for each packet, whether filtering can be implemented for each block that is a group of packets, whether filtering can be implemented using binary information (0 or 1), whether filtering can be implemented using information other than binary information, or the like. More specific examples of the filtering scheme are described below in detail.

The capability obtainment unit 503 in the controller 50 also transmits a marking capability obtainment request for obtaining a marking scheme which can be configured in the marker operation configuration unit 103 in the marker 10 (S604) and obtains a marking capability indicating a configurable marking scheme (S605). For example, the marking capability includes whether marking can be implemented for each packet, whether marking can be implemented for each block that is a group of packets, whether marking can be implemented using binary information (0 or 1), whether marking can be implemented using information other than binary information, or the like.

The capability obtainment unit 503 in the controller 50 also transmits a source capability obtainment request for obtaining an available codec in the source 30 (S606) and obtains a source capability indicating the available codec (for example, H.264, JPEG, or the like) (S607).

The operation configuration unit 505 in the controller 50 obtains the capabilities of the respective nodes obtained by the capability obtainment unit 503 and harmonizes operations to be performed by the respective nodes such that the sink 40 can receive data distributed based on the sink request notification (S609).

The operation configuration unit 505 in the controller 50 provides a filtering scheme to the filter operation configuration unit. 203 in the filter 20 (S610), which in turn provides the filter scheme to the filtering unit. 205 (S611).

The operation configuration unit 505 in the controller 50 provides a marking scheme to the marker operation configuration unit 103 in the marker 10 (S612), which in turn provides the marking scheme to the marking unit 105 (S613).

Further, the operation configuration unit 505 in the controller 50 configures a codec to be used for the source 30 (S614).

When the operation configuration unit 505 in the controller 50 receives a response to the configuration or the provision, the operation configuration unit 505 transmits a ready notification to the sink 40 (S615).

In the following steps, data are distributed as described in the steps S204-S208 illustrated in FIG. 12.

<First Example of Marking Scheme in Marker>

Next, marking schemes to be used by the marking unit 105 in the marker 10 are described in detail.

Figure 20A:
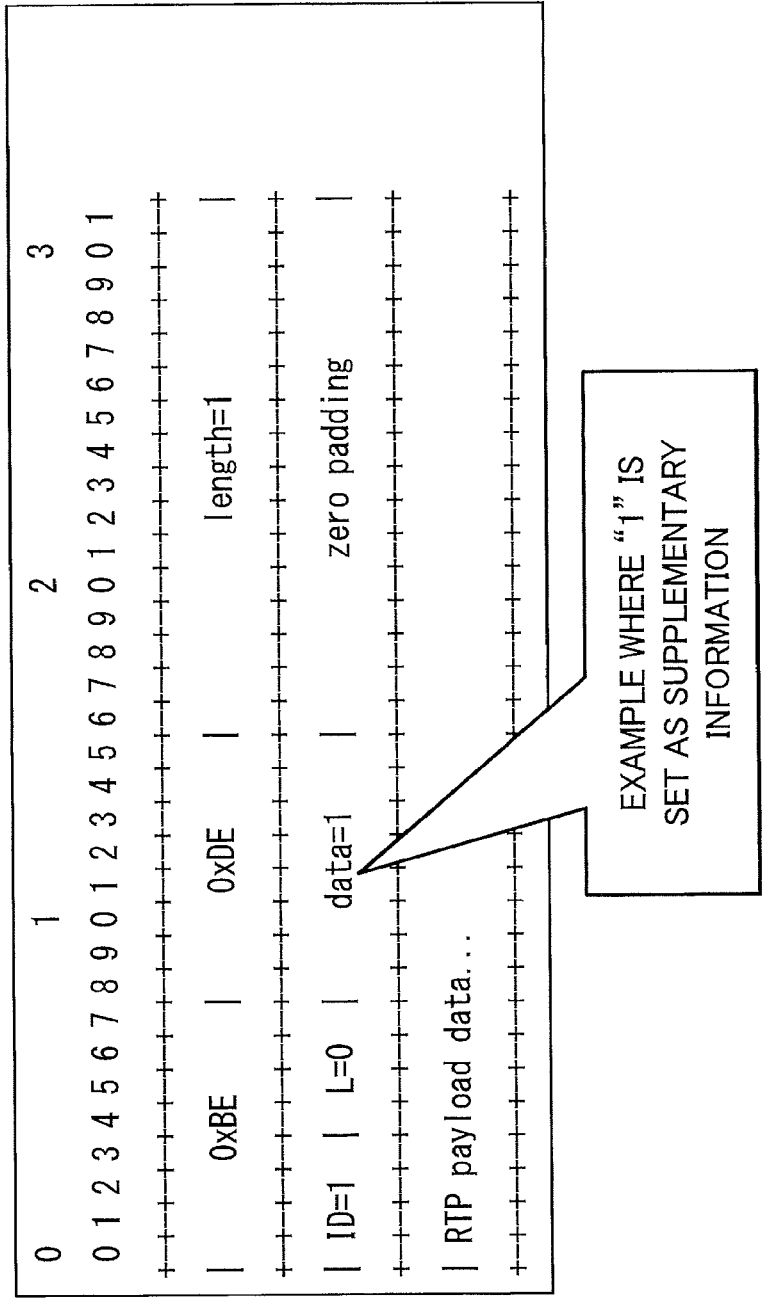
FIG. 20A is a first example of a marking scheme in a marker (in the case where an RTP extension header is used).

FIGS. 20A and 20B are first examples of marking schemes in the marker 10. As described above, the marker 10 can add supplementary information indicating data content (a component or the like) to a packet. More specifically, the marker 10 may add supplementary information to a header or a payload of a packet.

For example, when an RTP is used as a protocol for transmitting data, the maker 10 can add supplementary information to an RTP extension header as illustrated in FIG. 20A. Since an RTP extension header is standardized in IETF RFC 5285 (https://tools.ietf.org/rfc/rfc5285.txt), the sink 40 can utilize existing library codes without modification to read the RTP extension header. Further, when a receiver node does not recognize the RTP extension header, the receiver node can ignore the RTP extension header and process the packet as usual. However, when the amount of information is small, setting a length, an ID, and so on which are defined in the RTP extension header increases overhead.

Alternatively, the marker 10 can add supplementary information to an RIP payload as illustrated in FIG. 20B. Since only necessary information is embedded in the RTP payload, overhead caused by the amount of necessary information is small. However, since embedding the necessary information in the RIP header is proprietary and is not standardized, the sink 40 needs to modify the read process according to how the necessary information is embedded.

Supplementary information may be represented by binary information (0 or 1) or semantics information indicating the meanings of the supplementary information.

When supplementary information is represented by binary information, which is called a pulse scheme, 1 may be added to data not to be filtered out and 0 may be added to data to be filtered out. Alternatively, 1 may added to data not to be filtered out and nothing may be added to data to be filtered out. The pulse scheme can reduce workloads of the marker 10 and the filter 20. However, if three types of filtering processes are needed in the filter 20, another type of information is further needed.

When supplementary information is represented by semantics information, which is called a semantics scheme, information about whether a component of image data is a Y component, Cb component, or a Cr component is added as the semantics information, for example. In another example, a scanning line number or a coordinate of image data may be added. According to the semantics scheme, although a workload of the marker 10 is increased, filtering can be implemented only using supplementary information.

<Second Example of Marking Scheme in Marker>

Figure 21A:
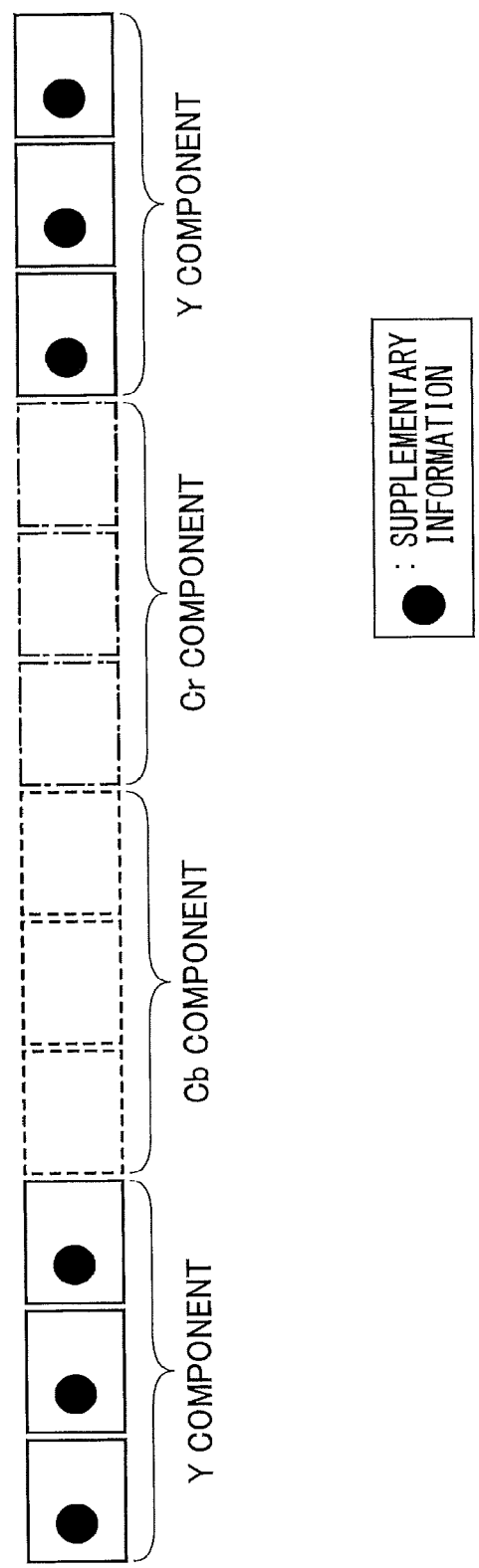
FIG. 21A is a second example of a marking scheme (packet-level marking scheme) in a marker.

FIGS. 21A and 21B are second examples of marking scheme in the marker 10. As described above, the marker 10 can add supplementary information indicating data content (a component or the like) to a packet. More specifically, the marker 10 may add supplementary information to each packet. Alternatively, when metadata indicating a type of a data portion can be obtained from the source 30, the marker 10 may add supplementary information to a packet at a boundary where the type of data portion changes.

FIG. 21A illustrates a packet-level marking scheme in which supplementary information is added to each packet. While supplementary information is typically added to every packet, supplementary information may not be added to data (for example, a Cb component and a Cr component) to be filtered out. Since the packet-level marking scheme is robust to packet loss, a sequence error, and packet duplication, the packet-level marking scheme is suitable for a source using a UDP (User Datagram Protocol). However, since supplementary information is added to every packet, workloads of the marker 10 and the filter 20 are large and a network bandwidth is consumed accordingly.

FIG. 21B illustrates a block-level marking scheme in which supplementary information is added to a packet at a boundary where a type of a data portion changes. For example, assuming that data portions are transmitted without interleaving, a packet at a boundary where a block that is a group of data portions changes is marked such as at a boundary between any two of a Y component, a Cb component, and a Cr component. According to the block-level marking scheme, since supplementary information is added at a boundary, workloads of the marker 10 and the filter 20 can be reduced and a network bandwidth can be saved. However, since the block-level marking scheme is sensitive to packet loss, a sequence error, and packet duplication, it is difficult to apply the block-level marking scheme to a source using a UDP.

An operation of the filter 20 depends on whether the packet-level marking scheme or the block-level marking scheme is used in the marker 10. In the following, the operation of the filter 20 is described in detail. As illustrated in the step S236 in FIG. 15, the filter 20 determines whether data can be transferred to the sink 40 based on supplementary information added by the marker 10. The step S236 is described in detail.

Figure 22:
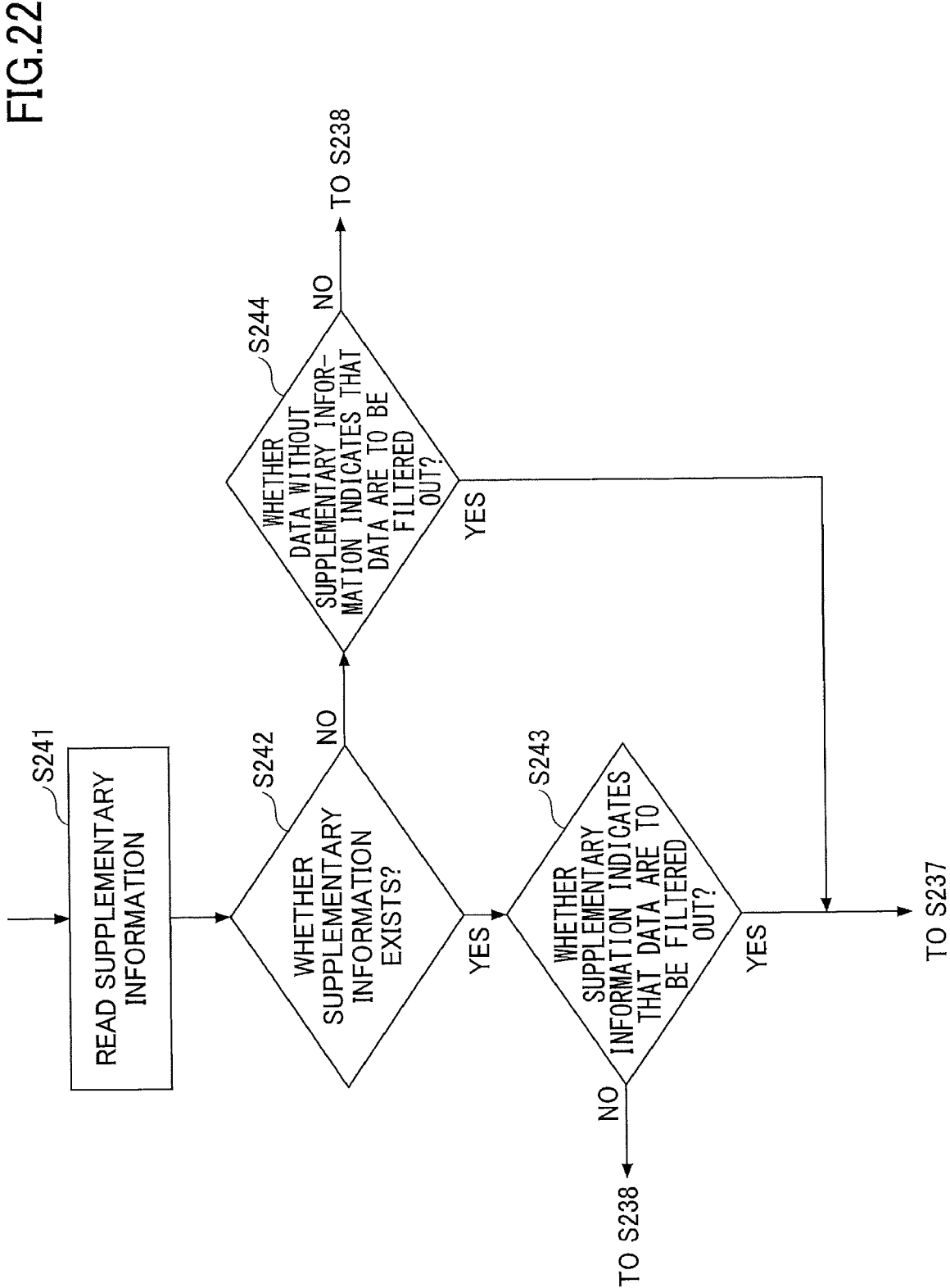
FIG. 22 is a flowchart illustrating a filtering process in a filter in the case where a packet-level marking scheme is used.

FIG. 22 is a flowchart illustrating a filtering process when the packet-level marking scheme is used.

The filtering unit 205 in the filter 20 tries to read supplementary information added by the marker 10 (S241). When supplementary information is found (S242: Yes) and the supplementary information indicates that data are to be filtered out (S243: Yes), the process continues to step S237 where the data are discarded. When supplementary information is found (S242: Yes) and the supplementary information indicates that data are not to be filtered out (S243: No), the process continues to step S238 where the data are transferred to the sink 40.

When supplementary information is not found (S242: No) and data without supplementary information are to be filtered out (S244: Yes), the process continues to step S237 where the data are discarded. When supplementary information is not found (S242: No) and data without supplementary information are not to be filtered out (S244: No), the process continues to step S238 where the data are transferred to the sink 40.

Figure 23:
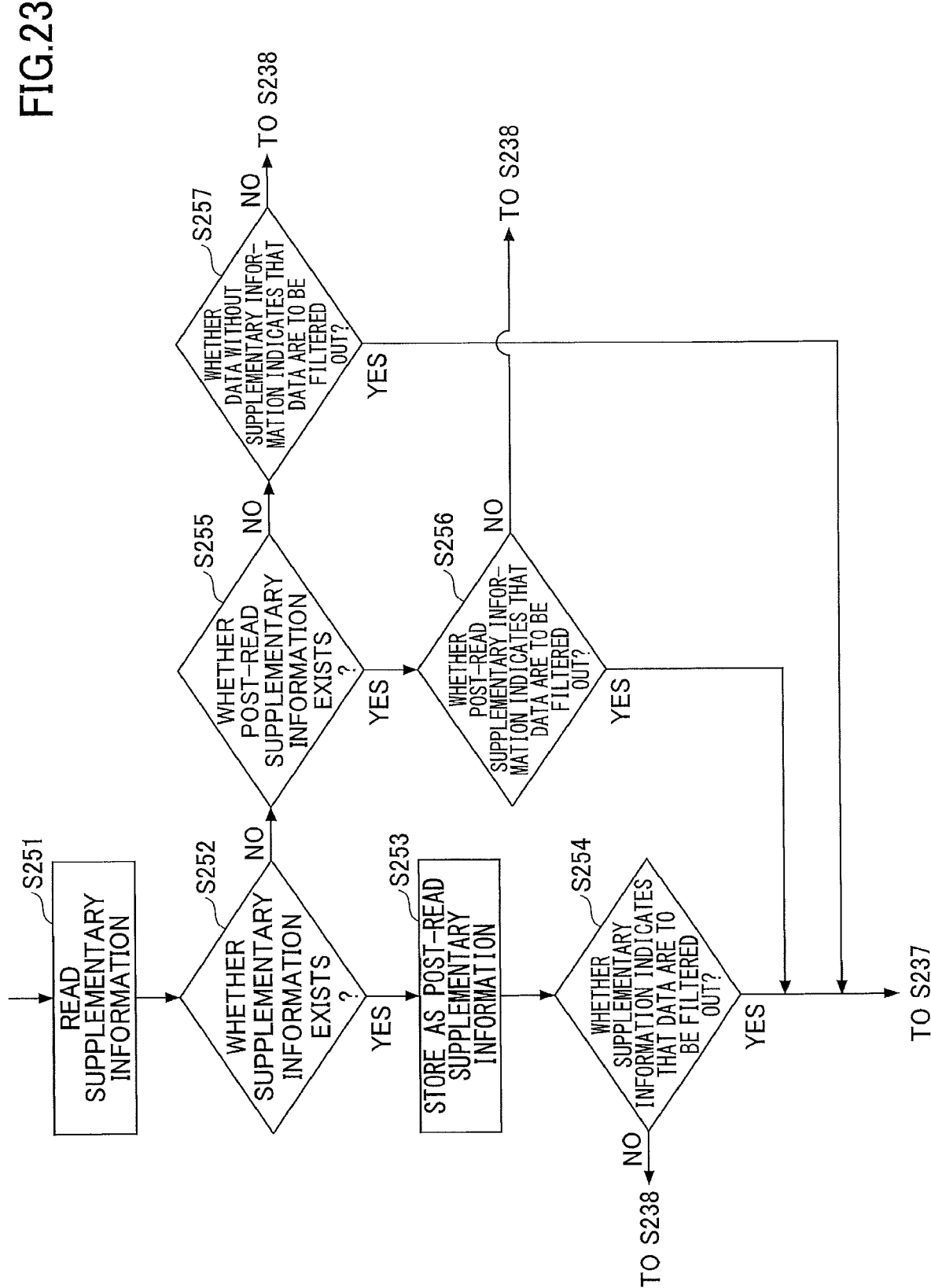
FIG. 23 is a flowchart illustrating a filtering process in a filter in the case where a block-level marking scheme is used.

FIG. 23 is a flowchart illustrating a filtering process when the block-level marking scheme is used.

The filtering unit 205 in the filter 20 tries to read supplementary information added by the marker 10 (S251). When supplementary information is found (S252: Yes), the supplementary information is stored as post-read supplementary information (S253). When the supplementary information indicates that data are to be filtered out (S254: Yes), the process continues to step S237 where the data are discarded. When the supplementary information indicates that data are not to be filtered out (S254: No), the process continues to step S238 where the data are transferred to the sink 40.

When supplementary information is not found (S252: No), the filtering unit 205 checks whether post-read supplementary information is stored. When post-read supplementary information is stored (S255: Yes) and the post-read supplementary information indicates that data are to be filtered out (S256: Yes), the process continues to step S237 where the data are discarded. When post-read supplementary information is stored (S255: No) and the post-read supplementary information indicates that data are not to be filtered out (S256: No), the process continues to step S238 where the data are transferred to the sink 40.

When supplementary information is not found and post-read supplementary information is not stored (S255: No) and data without supplementary information are to be filtered out (S257: Yes), the process continues to step S237 where the data are discarded. When supplementary information is not found and post-read supplementary information is not stored (S255: No) and data without supplementary information are not to be filtered out (S257: No), the process continues to step S238 where the data are transferred to the sink 40.

<Example of Transfer End Notification in Filter>

In the data distribution system in which the marker 10 and the filter 20 are located between the source 30 and the sink 40, a portion of data is discarded due to filtering by the filter 20, as described above. Typically, the sink 40 sets a timeout period to determine whether data are lost. When desired data do not arrive before the timeout period, the sink 40 determines that the data are lost and tries to decode data only using received data to the extent possible. However, data processing such as rendering in the sink 40 is delayed by the timeout period. In an embodiment of the present invention, the filter 20 provides a notification about data loss to the sink 40, which can shorten the delay in data processing in the sink 40 and contribute to real-time viewing and image analysis.

Figure 24:
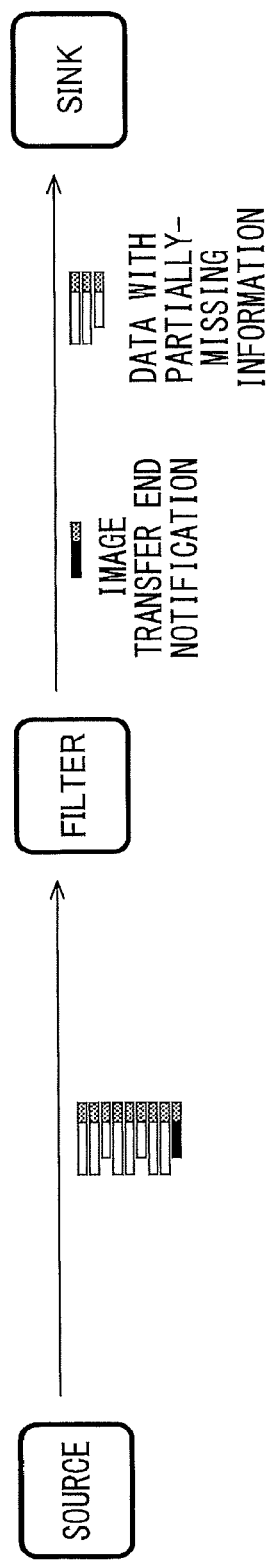
FIG. 24 is a first example of transmitting a transfer end notification from a filter to a sink.

FIG. 24 illustrates a first example of transmitting a transfer end notification that packet transfer is complete from the filter 20 to the sink 40. The source 30 transmits a packet only including EOI information indicating an end of data such as image data or the like to the filter 20. When the communication unit 201 in the filter 20 receives the packet only including EOI information, the filter 20 transfers the packet to the sink 40.

Figure 25:
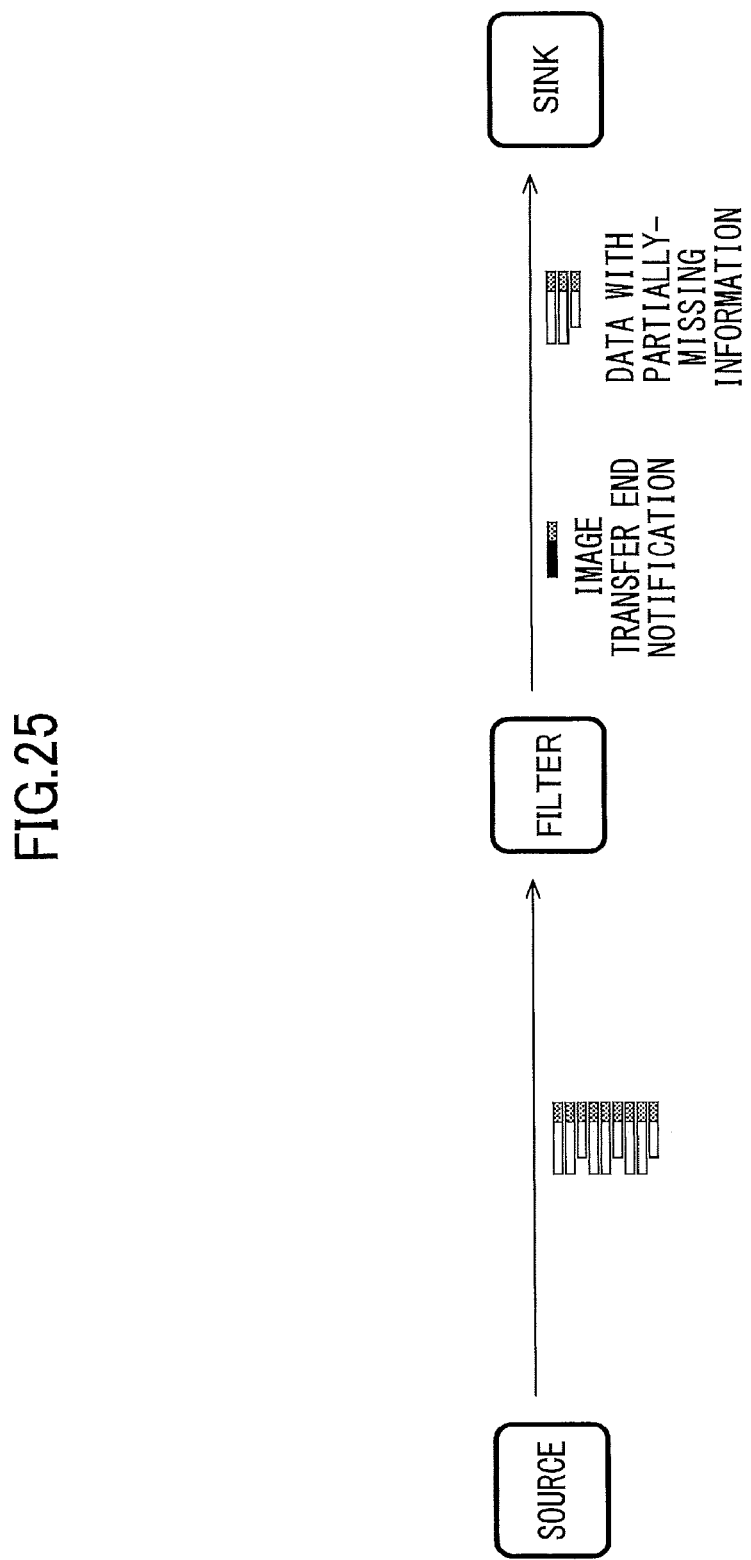
FIG. 25 is a second example of transmitting a transfer end notification from a filter to a sink.

FIG. 25 illustrates a second example of transmitting a transfer end notification from the filter 20 to the sink 40. Assuming that the filter 20 uses a filtering scheme of transferring only a Y component of image data, when the filter 20 receives a Cr component after transferring a Y component, the filter 20 can recognize that subsequent packets are to be discarded. Thus, the communication unit 201 in the filter 20 determines that packet transfer is complete and transmits a packet only including BOX information indicating an end of data to the sink 40.

When the sink 40 receives the transfer end notification, the sink 40 can start data processing without waiting for the timeout period.

While a single source transmits data in the first and second examples, a plurality of sources may transmit data. When a plurality of sources are involved, at least one marker is associated with each source and a packet transmitted from each source can be identified by 5-tuple information in the packet and transferred to an associated marker.

<Effect of Embodiment of Invention>

According to an embodiment of the present invention, it is possible to reduce workloads of a source node and a plurality of destination nodes when the source node separately distributes data to the destination nodes with different requirements, and to decrease communication traffic. Thus, a problem in the prior art that a communication bandwidth and a workload of a source node are consumed when the source node distributes data to a plurality of destination nodes according to different requirements can be solved. Further, a problem that workloads of destination nodes are increased by interpretation or conversion of data according to their own purposes when a source node simultaneously distributes data to the destination nodes can be solved.

In summary, a source node of an image or the like need not have a capability of separately distributing data to destination nodes according to different requirements, and thus efficiency in data processing can be improved and a cost of the source node can be reduced.

Further, since only one type of information is transmitted from the source node over a network, the source node need not separately distribute data to the respective destination nodes, and thus a shortage of a network bandwidth can be avoided.

Moreover, since the destination node can receive data according to a distribution scheme or data content suitable for its own purpose, the destination node need not interpret or convert data according to its own purpose. Thus, efficiency in data processing can be improved and a cost of the destination node can be reduced.

<Exemplary Hardware Configuration>

Figure 26:
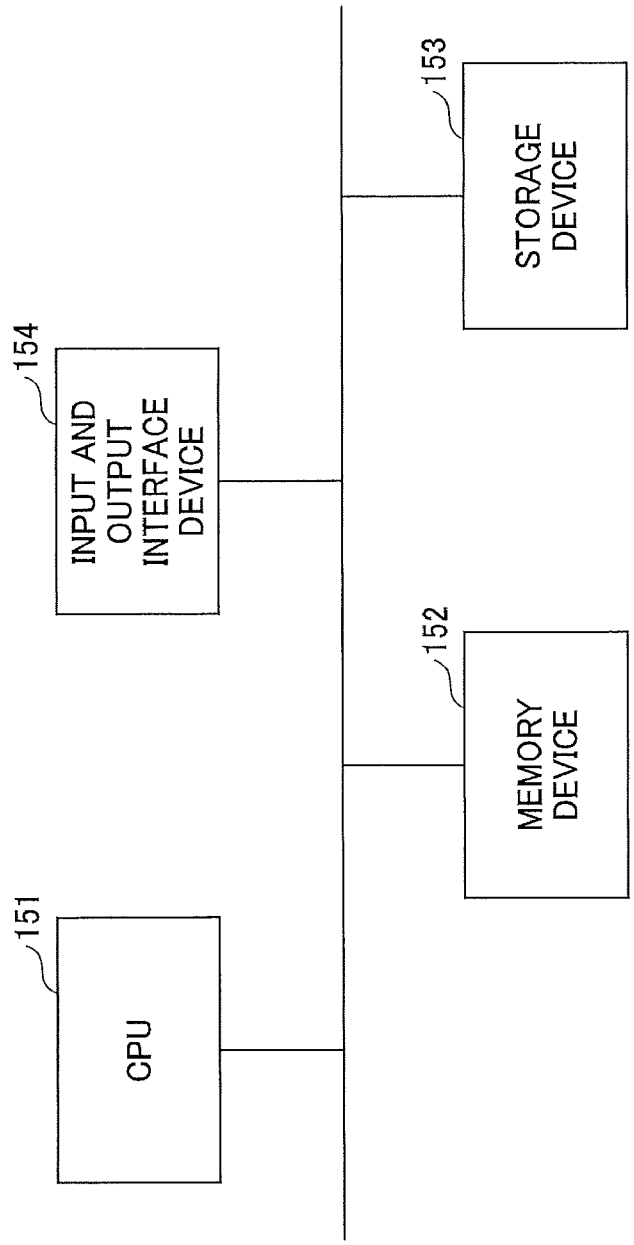
FIG. 26 is an exemplary hardware configuration of each node according to an embodiment of the present invention.

FIG. 26 illustrates an example of a hardware configuration of each node (the marker 10, the filter 20, the source 30, the sink 40, or the controller 50) according to an embodiment of the present invention. Each node may be a computer including a processor 151 such as a central processing unit (CPU), a memory device 152 such as a random access memory (RAM) or a read-only memory (ROM), a storage device 153 such as a hard disk, and so on. For example, functions and operations of each node are realized when the CPU processes data and executes a program stored in the storage device 153 or the memory device 152. Information necessary for each node may be input by an input and output interface device 154 and a result obtained by each node may be output by the input and output interface device 154.

<Remarks>

For convenience of explanation, each node according to the embodiments of the present invention has been described with reference to functional block diagrams, but each node may be implemented in hardware, software, or combinations thereof. For example, the embodiment of the present invention may be realized by a program for causing a computer to implement each function in each node according to the embodiment of the present invention, a program for causing a computer to perform each step in the method according to the embodiment of the present invention, or the like. In addition, two or more functional elements may be combined as appropriate. Further, the method according to the embodiment of the present invention may be performed in a different order as illustrated in the embodiment.

While the solution is described above to reduce workloads of a source node and a plurality of destination nodes when the source node distributes data to the destination nodes with different requirements and to decrease communication traffic, the present invention is not limited to the embodiments, but various modifications and applications can be made by those skilled in the art within the scope of the claims.

The present international application is based on and claims priority to Japanese Patent Application No. 2017-019891 filed on Feb. 6, 2017, the entire contents of which are hereby incorporated by reference.

DESCRIPTION OF NOTATIONS 10 marker
20 filter
30 source
40 sink
50 controller
101 communication unit
103 marker operation configuration unit
105 marking unit
107 signaling unit
201 communication unit
203 filter operation configuration unit
205 filtering unit
207 signaling unit
501 communication unit
503 capability obtainment unit
505 operation configuration unit
151 CPU
152 memory device
153 storage device
154 input and output interface device

The invention claimed is:

1. A data distribution system including a source configured to distribute data and a sink configured to process the distributed data, comprising:
   a marker configured to receive a packet distributed by the source, add supplementary information to the received packet based on metadata added to a header of the received packet, and transfer the packet; and
   a filter configured to receive the packet transferred by the marker, determine whether the received packet can be transferred to the sink based on the supplementary information added to the received packet, and transfer the packet to the sink if the packet can be transferred to the sink, wherein the source decomposes image data to be distributed into a plurality of components or partial images based on at least one of luminance information, frequency information, segment information, and coordinate information of the image data, adds, to the header of the packet, the metadata indicating each component or each partial image of the decomposed image data, and distributes the packet, wherein the image data is separated into a plurality of packets which are differentiated based on the on at least one of luminance information, frequency information, segment information, and coordinate information of the image data, and when the filter determines that less than all of the components or partial images of the image data can be transferred to the sink, the filter transfers only the packets corresponding to the components or partial images of the image data that can be transferred to the sink while discarding packets corresponding to the components or partial images of the image data that cannot be transferred to the sink.

2. The data distribution system as claimed in claim 1, wherein the marker adds the supplementary information to each packet.

3. The data distribution system as claimed in claim 1, wherein the marker adds the supplementary information to a header or a payload of the packet.

4. The data distribution system as claimed in claim 1, wherein the marker adds binary information or semantics information as the supplementary information.

5. The data distribution system as claimed in claim 1, wherein the filter transmits a transfer end notification to the sink upon completion of packet transfer to the sink.

6. The data distribution system as claimed in claim 1, further comprising:
a controller configured to receive a sink request notification indicating data content requested by the sink and, based on the sink request notification, configure the marker to add the supplementary information and configure the filter to determine whether the packet can be transferred.

7. The data distribution system as claimed in claim 6, wherein the controller obtains a source capability of the source, a marking capability of the marker, and a filtering capability of the filter, and configures the marker to add the supplementary information and configures the filter to determine whether the packet can be transferred based on the source capability, the marking capability, and the filtering capability.

8. A data distribution system including a source configured to distribute data and a sink configured to process the distributed data, comprising:
a marker configured to receive a packet distributed by the source, add supplementary information to a packet at a boundary where a type of a data portion changes based on metadata added to a header of the received packet, and transfer the packet; and
a filter configured to receive the packet transferred by the marker, determine whether the received packet can be transferred to the sink based on the supplementary information added to the received packet, and transfer the packet to the sink if the packet can be transferred to the sink,
wherein the source decomposes data to be distributed into a plurality of data portions, adds the metadata indicating the type of the data portion to the header of the packet, and distributes the packet,
and
wherein the data is separated into a plurality of packets which are differentiated based on the data portions, and when the filter determines that less than all of the types of data portions of the data can be transferred to the sink, the filter transfers only the packets corresponding to the types of data portions that can be transferred to the sink while discarding packets corresponding to the types of data portions that cannot be transferred to the sink.

9. A data distribution method in a data distribution system including a source configured to distribute data and a sink configured to process the distributed data, the data distribution system further including a marker and a filter which are located between the source and the sink, comprising steps of:
decomposing, by the source, image data to be distributed into a plurality of components or partial images based on at least one of luminance information, frequency information, segment information, and coordinate information of the image data, adding, to a header of a packet, metadata indicating each component or each partial image of the decomposed image data, and distributing the packet;
receiving, by the marker, the packet distributed by the source, adding supplementary information to the received packet based on the metadata added to the header of the received packet, and transferring the packet; and
receiving, by the filter, the packet transferred by the marker, determining whether the received packet can be transferred to the sink based on the supplementary information added to the received packet, and transferring the packet to the sink if the packet can be transferred to the sink,
wherein the image data is separated into a plurality of packets which are differentiated based on the on at least one of luminance information, frequency information, segment information, and coordinate information of the image data, and when the filter determines that less than all of the components or partial images of the image data can be transferred to the sink, the filter transfers only the packets corresponding to the components or partial images of the image data that can be transferred to the sink while discarding packets corresponding to the components or partial images of the image data that cannot be transferred to the sink.

10. A marker located between a source configured to distribute data and a sink configured to process the distributed data, comprising:
processing circuitry configured to implement:
a reception unit configured to receive a packet distributed by the source;
a supplementary information addition unit configured to add supplementary information to the received packet based on metadata added to a header of the packet; and
a transfer unit configured to transfer the packet to which the supplementary information is added to a filter configured to determine whether the packet can be transferred to the sink,
wherein the source decomposes image data to be distributed into a plurality of components or partial images based on at least one of luminance information, frequency information, segment information, and coordinate information of the image data, adds, to the header of the packet, the metadata indicating each component or each partial image of the decomposed image data, and distributes the packet, and wherein the image data is separated into a plurality of packets which are differentiated based on the on at least one of luminance information, frequency information, segment information, and coordinate information of the image data, and when the filter determines that less than all of the components or partial images of the image data can be transferred to the sink, the filter transfers only the packets corresponding to the components or partial images of the image data that can be transferred to the sink while discarding packets corresponding to the components or partial images of the image data that cannot be transferred to the sink.

11. A non-transitory computer-readable recording medium having a program stored thereon for causing a computer to function as each unit of the marker as claimed in claim 10.

12. A data distribution method in a data distribution system including a source configured to distribute data and a sink configured to process the distributed data, the data distribution system further including a marker and a filter which are located between the source and the sink, comprising steps of:

decomposing, by the source, data to be distributed into a plurality of data portions, adding metadata indicating a type of a data portion to a header of a packet, and distributing the packet;

receiving, by the marker, the packet distributed by the source, adding supplementary information to a packet at a boundary where the type of the data portion changes based on the metadata added to the header of the received packet, and transferring the packet; and receiving, by the filter, the packet transferred by the marker, determining whether the received packet can be transferred to the sink based on the supplementary information added to the received packet, and transferring the packet to the sink if the packet can be transferred to the sink, wherein the data is separated into a plurality of packets which are differentiated based on the data portions, and when the filter determines that less than all of the types of data portions of the data can be transferred to the sink, the filter transfers only the packets corresponding to the types of data portions that can be transferred to the sink while discarding packets corresponding to the types of data portions that cannot be transferred to the sink.

13. A marker located between a source configured to distribute data and a sink configured to process the distributed data, comprising:

processing circuitry configured to implement:
a reception unit configured to receive a packet distributed by the source;
a supplementary information addition unit configured to add supplementary information to a packet at a boundary where a type of a data portion changes based on metadata added to a header of the packet, and transfer the packet; and
a transfer unit configured to transfer the packet to which the supplementary information is added to a filter configured to determine whether the packet can be transferred to the sink, wherein the source decomposes data to be distributed into a plurality of data portions, adds the metadata indicating the type of the data portion to the header of the packet, and distributes the packet, wherein the data is separated into a plurality of packets which are differentiated based on the data portions, and when the filter determines that less than all of the types of data portions of the data can be transferred to the sink, the filter transfers only the packets corresponding to the types of data portions that can be transferred to the sink while discarding packets corresponding to the types of data portions that cannot be transferred to the sink.

14. A non-transitory computer-readable recording medium having a program stored thereon for causing a computer to function as each unit of the marker as claimed in claim 13.

* * * * *